United States Patent
Cha et al.

(10) Patent No.: US 12,489,574 B2
(45) Date of Patent: Dec. 2, 2025

(54) METHOD FOR TRANSMITTING AND RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Hyunsu Cha, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 411 days.

(21) Appl. No.: 18/019,737

(22) PCT Filed: Aug. 3, 2021

(86) PCT No.: PCT/KR2021/010145
§ 371 (c)(1),
(2) Date: Feb. 3, 2023

(87) PCT Pub. No.: WO2022/030948
PCT Pub. Date: Feb. 10, 2022

(65) Prior Publication Data
US 2024/0259150 A1    Aug. 1, 2024

(30) Foreign Application Priority Data

Aug. 3, 2020  (KR) .......................... 10-2020-0096991

(51) Int. Cl.
H04W 72/04    (2023.01)
H04L 5/00     (2006.01)
(Continued)

(52) U.S. Cl.
CPC ....... *H04L 5/0048* (2013.01); *H04W 74/0833* (2013.01)

(58) Field of Classification Search
None
See application file for complete search history.

(56) References Cited

U.S. PATENT DOCUMENTS

2018/0220392 A1*  8/2018  Ly ............................. G01S 5/10
2019/0327762 A1   10/2019  Takeda et al.
(Continued)

FOREIGN PATENT DOCUMENTS

CN    111294984      6/2020
KR    1020200050901  5/2020
(Continued)

OTHER PUBLICATIONS

European Patent Office Application Serial No. 21853153.1, Search Report dated Jul. 30, 2024, 9 pages.
(Continued)

*Primary Examiner* — Maharishi V Khirodhar
(74) *Attorney, Agent, or Firm* — LEE, HONG, DEGERMAN, KANG & WAIMEY

(57) ABSTRACT

On-demand downlink positioning (DL PRS) procedure in a wireless communication system, in which a terminal may transmit request information including information regarding a number of DL PRS resources, information regarding a DL PRS resource bandwidth, and information regarding a DL PRS resource repetition, receive DL PRS configuration information, and receive one or more DL PRSs based on the DL PRS configuration information.

8 Claims, 18 Drawing Sheets

(51) Int. Cl.
*H04W 74/0833* (2024.01)
*H04W 76/00* (2018.01)
*H04W 88/08* (2009.01)

(56) References Cited

U.S. PATENT DOCUMENTS

| | | | |
|---|---|---|---|
| 2019/0327765 A1 | 10/2019 | Mukherjee et al. | |
| 2020/0028648 A1* | 1/2020 | Akkarakaran | ........ H04W 76/27 |
| 2020/0107286 A1* | 4/2020 | Akkarakaran | ........ H04W 64/00 |
| 2021/0311158 A1* | 10/2021 | Akkarakaran | ........ G01S 5/0226 |
| 2022/0110085 A1* | 4/2022 | Khoryaev | ............. H04L 5/0051 |

FOREIGN PATENT DOCUMENTS

| | | |
|---|---|---|
| WO | 2020064120 | 4/2020 |
| WO | 2020146739 | 7/2020 |

OTHER PUBLICATIONS

Intel Corporation, "Support of On-demand DL PRS and NR Positioning for UEs in RRC-Inactive state," 3GPP TSG RAN WG2 #105-e, R1-2104910, May 20201, 5 pages.
PCT International Application No. PCT/KR2021/010145, Search Report dated Nov. 18, 2021, 16 pages.

* cited by examiner

- Prior Art -

- Prior Art -

- Prior Art -

- Prior Art -

- Prior Art -

(a)

- Prior Art -

(b)

- Prior Art -

- Prior Art -

- Prior Art -

- Prior Art -

(a)

(b)

METHOD FOR TRANSMITTING AND RECEIVING SIGNAL IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2021/010145, filed on Aug. 3, 2021, which claims the benefit of earlier filing date and right of priority to Korean Application No. 10-2020-0096991, filed on Aug. 3, 2020, the contents of which are all incorporated by reference herein in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method based on timing measurement and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method of transmitting and receiving a signal in a wireless communication system and apparatus for supporting the same.

According to various embodiments, a method performed by a terminal in a wireless communication system may be provided.

According to various embodiments, the method may include transmitting request information related to requesting one or more downlink (DL) positioning reference signals (PRSs), receiving configuration information related to the one or more DL PRSs in response to the request information, and receiving the one or more DL PRSs based on the configuration information.

According to various embodiments, the request information may include one or more requests related to the configuration information.

According to various embodiments, the one or more requests may include one or more of (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

According to various embodiments, the request information may be transmitted based on one or more of a physical random access channel (PRACH) preamble or a PRACH sequence.

According to various embodiments, the PRACH preamble or the PRACH sequence may be included in each of a plurality of predefined PRACH preambles or a plurality of predefined PRACH sequences.

According to various embodiments, the plurality of predefined PRACH preambles or the plurality of PRACH sequences may be divided into a plurality of groups.

According to various embodiments, one or more PRACH preambles or one or more PRACH sequences included in a first group among the plurality of groups may be mapped to requesting the one or more DL PRSs.

According to various embodiments, one or more PRACH preambles or one or more PRACH sequences included in a second group among the plurality of groups may be mapped to requesting one or more uplink reference signals (UL RSs).

According to various embodiments, one or more PRACH preambles or one or more PRACH sequences included in a third group among the plurality of groups may be mapped to requesting both the one or more DL PRSs and the one or more UL RSs.

According to various embodiments, the method may further include transmitting information related to one or more measurements for positioning based on the one or more DL PRSs.

According to various embodiments, the request information may further include information for requesting a resource for transmission of information related to the measurements.

According to various embodiments, the one or more requests may further include (v) a request related to one or more beam directions for transmission of the one or more DL PRSs.

According to various embodiments, the request information may further include information for requesting cancellation of one or more of the one or more PRS resources or one or more PRS resource sets for the one or more PRSs after a preset time, According to various embodiments, in response to the information for requesting the cancellation, information indicating canceling the one or more of the one or more PRS resources or one or more PRS resource sets for the one or more PRSs after the preset time may be received based on downlink control information (DCI) or a medium access control (MAC) control element (CE) signal.

According to various embodiments, a terminal operating in a wireless communication system may be provided.

According to various embodiments, the terminal may include a transceiver, and one or more processors coupled to the transceiver.

According to various embodiments, the one or more processors may be configured to transmit request information related to requesting one or more downlink (DL) positioning reference signals (PRSs), receive configuration information related to the one or more DL PRSs in response to the request information, and receive the one or more DL PRSs based on the configuration information.

According to various embodiments, the request information may include one or more requests related to the configuration information.

According to various embodiments, the one or more requests may include one or more of: (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

According to various embodiments, the request information may be transmitted based on one or more of a physical random access channel (PRACH) preamble or a PRACH sequence.

According to various embodiments, the PRACH preamble or the PRACH sequence may be included in each of a plurality of predefined PRACH preambles or a plurality of predefined PRACH sequences.

According to various embodiments, the plurality of predefined PRACH preambles or the plurality of PRACH sequences may be divided into a plurality of groups, According to various embodiments, one or more PRACH preambles or one or more PRACH sequences included in a first group among the plurality of groups may be mapped to requesting the one or more DL PRSs.

According to various embodiments, one or more PRACH preambles or one or more PRACH sequences included in a second group among the plurality of groups may be mapped to requesting one or more uplink reference signals (UL RSs).

According to various embodiments, one or more PRACH preambles or one or more PRACH sequences included in a third group among the plurality of groups may be mapped to requesting both the one or more DL PRSs and the one or more UL RSs.

According to various embodiments, the one or more processors are configured to transmit information related to one or more measurements for positioning based on the one or more DL PRSs.

According to various embodiments, the request information may further include information for requesting a resource for transmission of information related to the measurements.

According to various embodiments, the one or more processors may be configured to communicate with one or more of a mobile terminal, a network, and an autonomous vehicle other than a vehicle containing the terminal.

According to various embodiments, a method carried out by a base station in a wireless communication system may be provided.

According to various embodiments, the method may include receiving request information related to requesting one or more downlink (DL) positioning reference signals (PRSs), transmitting configuration information related to the one or more DL PRSs in response to the request information, and transmitting the one or more DL PRSs related to the configuration information, According to various embodiments, the request information may include one or more requests related to the configuration information.

According to various embodiments, the one or more requests may include one or more of (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

According to various embodiments, a base station operating in a wireless communication system may be provided.

According to various embodiments, the base station may include a transceiver, and one or more processors coupled to the transceiver.

According to various embodiments, the one or more processors may be configured to receive request information related to requesting one or more downlink (DL) positioning reference signals (PRSs), transmit configuration information related to the one or more DL PRSs in response to the request information, and transmit the one or more DL PRSs related to the configuration information.

According to various embodiments, the request information may include one or more requests related to the configuration information.

According to various embodiments, the one or more requests may include one or more of (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

According to various embodiments, a device operating in a wireless communication system may be provided.

According to various embodiments, the device may include one or more processors, and one or more memories operatively coupled to the one or more processors and configured to store one or more instructions which, when executed, cause the one or more processors to perform operations.

According to various embodiments, the operations including transmitting request information related to requesting one or more downlink (DL) positioning reference signals (PRSs), receiving configuration information related to the one or more DL PRSs in response to the request information, and receiving the one or more DL PRSs based on the configuration information, According to various embodiments, the request information may include one or more requests related to the configuration information.

According to various embodiments, the one or more requests may include one or more of (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

According to various embodiments, a non-volatile processor-readable medium storing one or more instructions that cause one or more processors to perform operations.

According to various embodiments, the operations may include transmitting request information related to requesting one or more downlink (DL) positioning reference signals (PRSs), receiving configuration information related to the one or more DL PRSs in response to the request information, and receiving the one or more DL PRSs based on the configuration information.

According to various embodiments, the request information may include one or more requests related to the configuration information.

According to various embodiments, the one or more requests include one or more of (i) a request related to the number of transmission and reception points (TRPs), (ii) a request related to the number of DL PRS resources included in a DL PRS resource set, (iii) a request related to a bandwidth of the DL PRS resources, or (iv) a request related to a repetition number of the DL PRS resources.

It will be understood by those skilled in the art that the above-described embodiments are merely part of various embodiments of the present disclosure, and various modifications and alternatives could be developed from the following technical features of the present disclosure.

Advantageous Effects

According to various embodiments, a signal may be effectively transmitted and received in a wireless communication system.

According to various embodiments, positioning may be effectively performed in a wireless communication system.

According to various embodiments, an on-demand RS required at the UE side may be requested.

According to various embodiments, positioning latency may be reduced.

According to various embodiments, network resources may be effectively managed.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
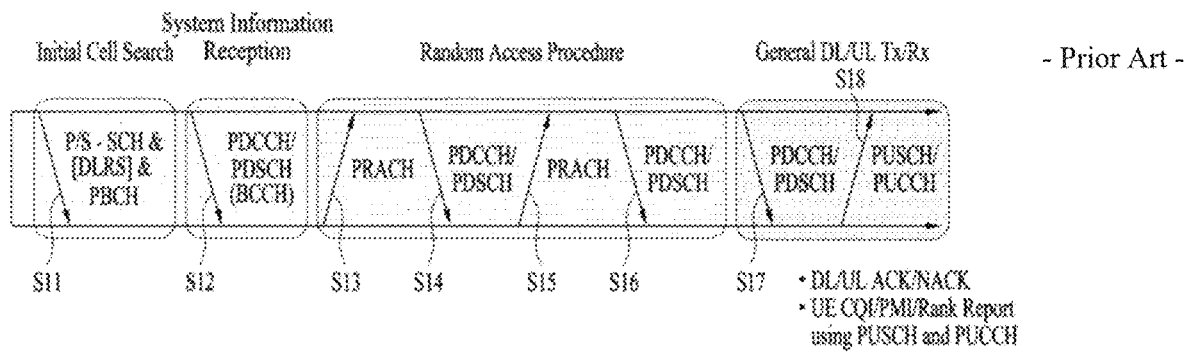
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information).

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structure

Figure 2:
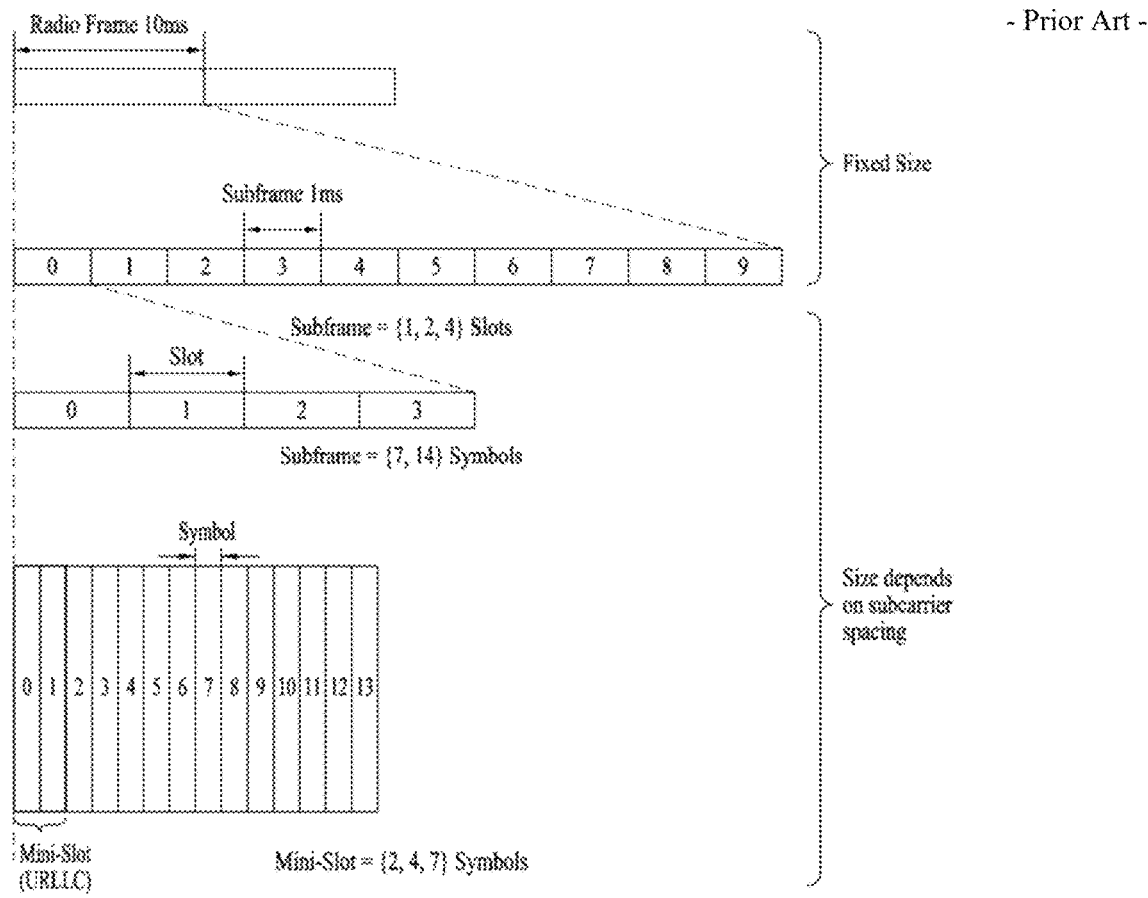
FIG. 2 is a diagram illustrating a radio frame structure in a new radio access technology (NR) system to which various embodiments are applicable.

FIG. 2 illustrates an NR system based radio frame structure which can be used for various embodiments.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 KHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHZ range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15\ kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu subframe}-1\}$ in an increasing order in a subframe, and with $n^\mu_{s,f} \in \{0, \ldots, N^{slot,\mu frame}-1\}$ in an increasing order in a radio frame. One slot includes Nμsymb consecutive OFDM symbols, and Nμsymb depends on a CP. The start of a slot nμs in a subframe is aligned in time with the start of an OFDM symbol nμs*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb represents the number of symbols in a slot, $N^{frame,\mu slot}$ represents the number of slots in a frame, and $N^{subframe,\mu slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
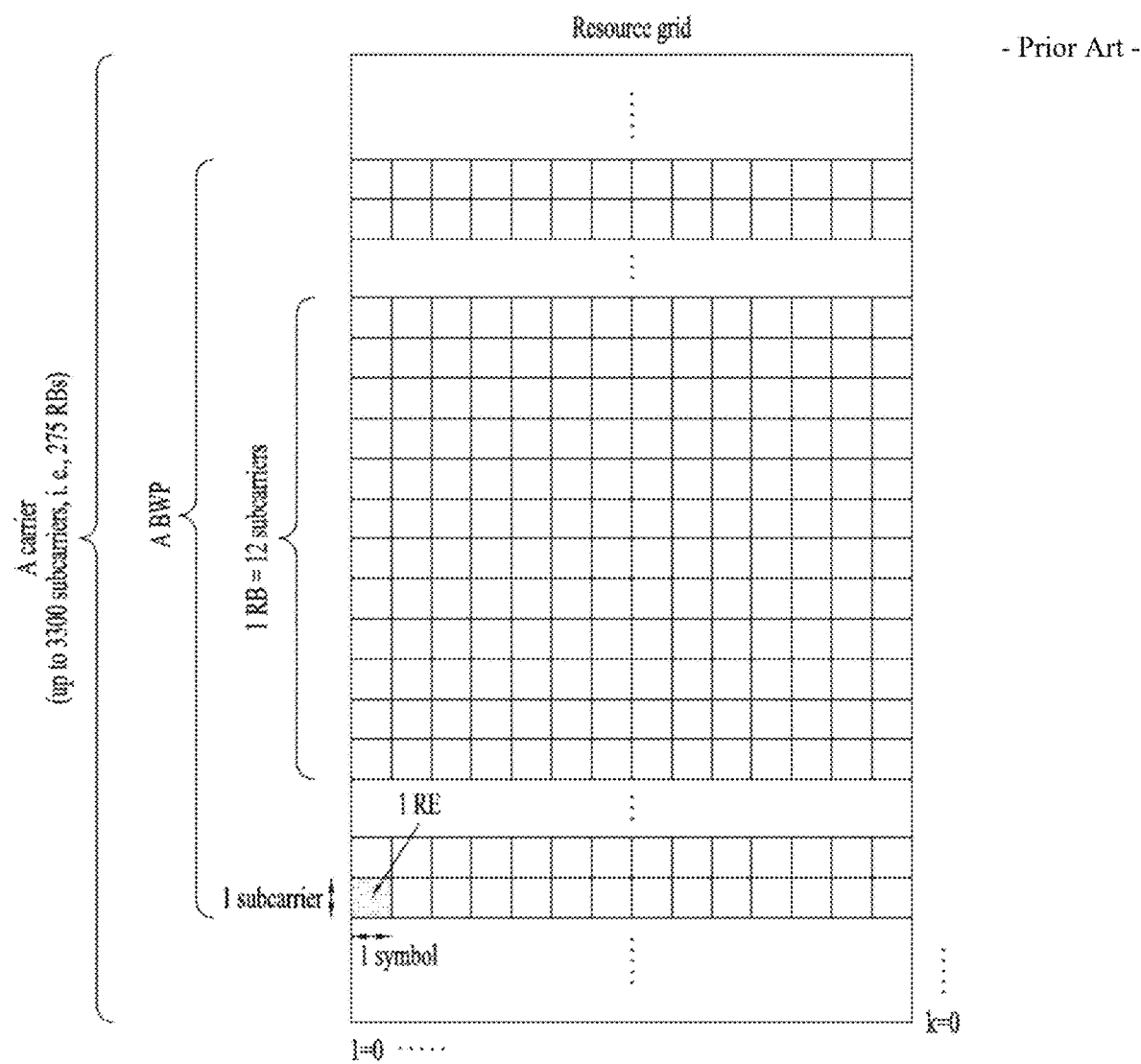
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as 14×2μ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration μ and a transmission direction, UL or DL. There is one resource grid for an SCS configuration μ, an antenna port p, and a transmission direction (UL or DL). Each element of the resource grid for the SCS configuration u and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
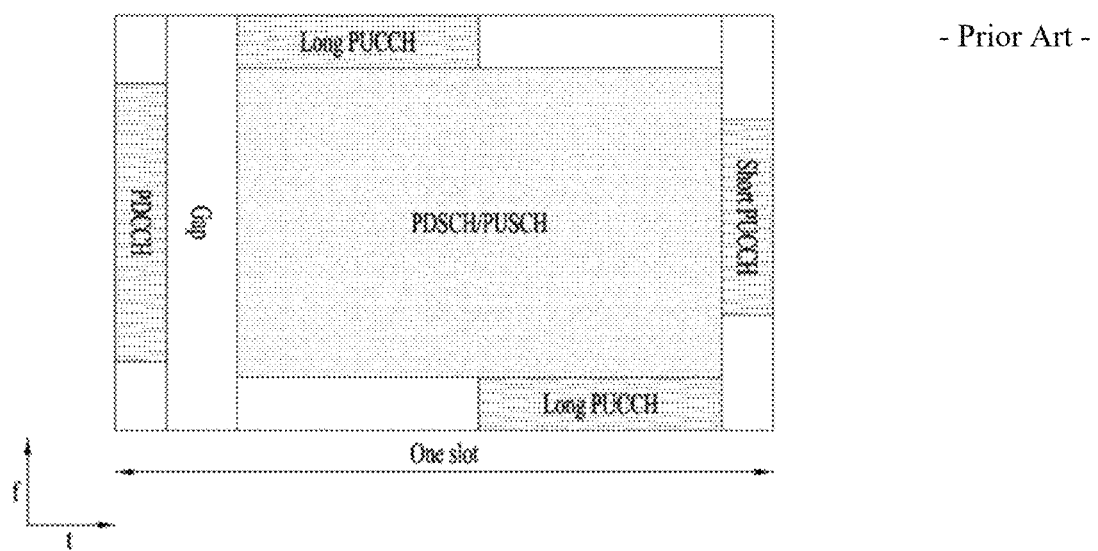
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below; and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.4 Random Access (RACH) Procedure

When a UE initially accesses a BS or has no radio resources for signal transmission, the UE may perform a random access procedure with the BS.

The random access procedure is used for various purposes. For example, the random access procedure may be used for initial network access in the RRC_IDLE state, an RRC connection reestablishment procedure, handover, UE-triggered UL data transmission, transition from the RRC_INACTIVE state, time alignment establishment in SCell addition, other system information (OSI) request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (RACH) procedure and a 2-step random access (RACH) procedure.

4-Step RACH: Type-1 Random Access Procedure

Figure 5:
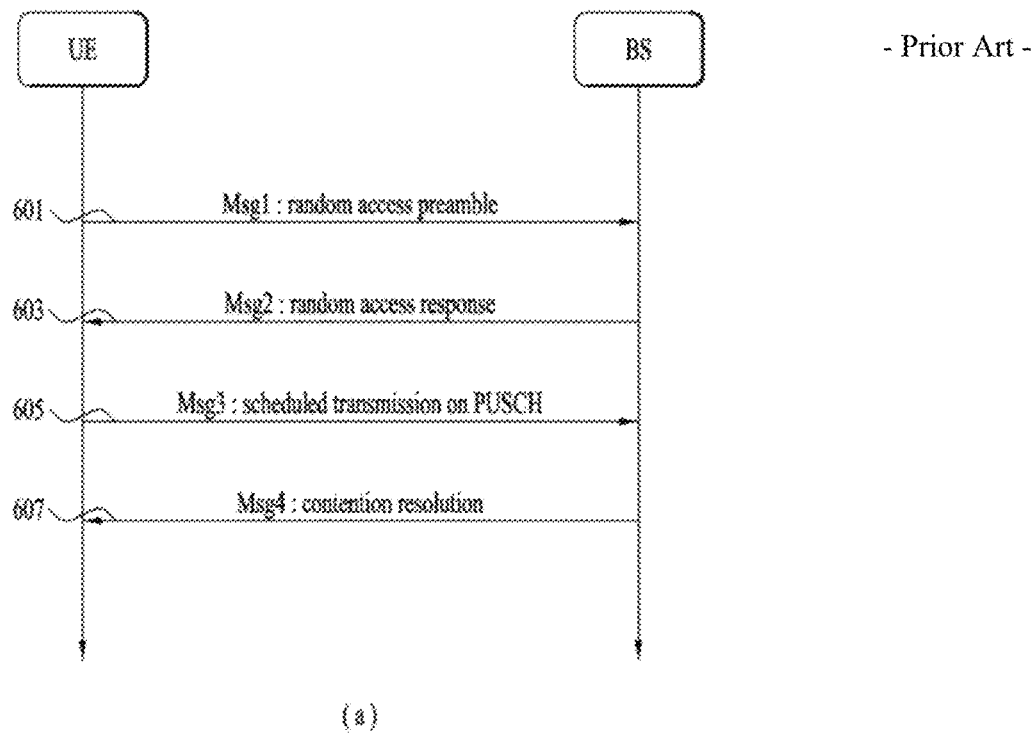
FIG. 5 is a diagram illustrating an exemplary 4-step RACH procedure to which various embodiments of the present disclosure are applicable.
Figure 5:
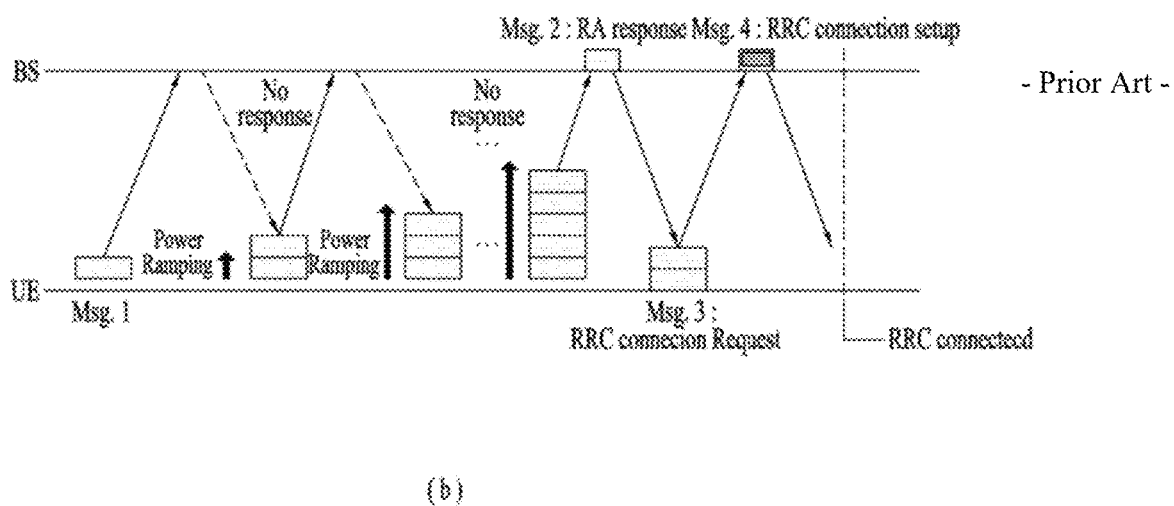

FIG. 5 is a diagram illustrating an exemplary 4-step RACH procedure to which various embodiments are applicable.

When the (contention-based) random access procedure is performed in four steps (4-step RACH procedure), the UE may transmit a message (Message 1 or Msg1) including a preamble related to a specific sequence on a physical random access channel (PRACH) (601) and receive a PDCCH and a response message (random access response (RAR) message) (Message 2 or Msg2) for the preamble on a PDSCH corresponding to the PDCCH (603). The UE transmits a message (Message 3 or Msg3) including a PUSCH based on scheduling information included in the RAR (605) and perform a contention resolution procedure involving reception of a PDCCH signal and a PDSCH signal corresponding to the PDCCH signal. The UE may receive a message (Message 4 or Msg4) including contention resolution information for the contention resolution procedure from the BS (607).

The 4-step RACH procedure of the UE may be summarized in Table 5 below.

TABLE 5

| | Type of Signals | Operations/Information obtained |
|---|---|---|
| $1^{st}$ step | PRACH preamble in UL | Initial beam obtainment<br>Random selection of RA-preamble ID |
| $2^{nd}$ step | Random Access Response on DL-SCH | Timing Advanced information<br>RA-preamble ID<br>Initial UL grant, Temporary C-RNTI |
| $3^{rd}$ step | UL transmission on UL-SCH | RRC connection request<br>UE identifier |
| $4^{th}$ step | Contention Resolution on DL | Temporary C-RNTI on PDCCH for initial access<br>C-RNTI on PDCCH for UE in RRC_CONNECTED |

In a random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 KHz.

Multiple preamble formats are defined by one or more RACH OFDM symbols and different cyclic prefixes (CPs) (and/or guard times). An RACH configuration for the initial bandwidth of a primary cell (PCell) is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in RACH resources associated with the selected SSB. For example, when retransmitting the RACH preamble, the UE may reselect one of the SSBs and retransmit the RACH preamble in RACH resources associated with the reselected SSB. That is, the RACH resources for the retransmission of the RACH preamble may be identical to and/or different from the RACH resources for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest transmission power, a power increment, and a power ramping counter.

The RAR information may include the preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may acquire timing advance information based on timing information detected from the PRACH preamble received from the UE and transmit the timing advance information. The UE may transmit a UL signal as Msg3 of the random access procedure on a UL-SCH based on the RAR information. Msg3 may include an RRC connection request and a UE ID. The network may transmit Msg4 in response to Msg3. Msg4 may be handled as a contention resolution message on DL. As the UE receives Msg4, the UE may enter the RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant start from the MSB and ends in the LSB, given as Table 6.

TABLE 6

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 7.

TABLE 7

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

2-Step RACH: Type-2 Random Access Procedure

Figure 6:
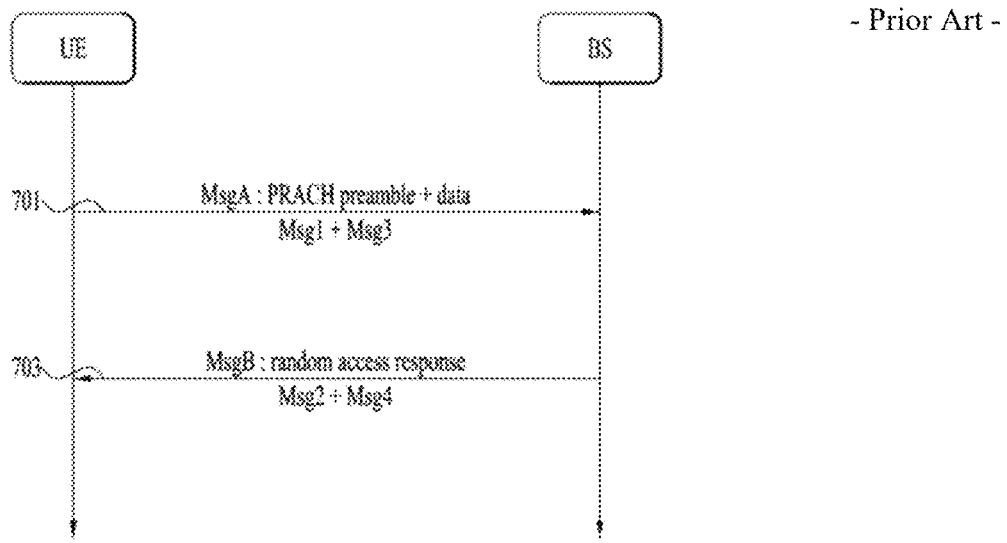
FIG. 6 is a diagram illustrating an exemplary 2-step RACH procedure to which various embodiments of the present disclosure are applicable.

FIG. 6 is a diagram illustrating an exemplary 2-step RACH procedure to which various embodiments are applicable.

A (contention-based) RACH procedure performed in two steps, that is, a 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (701).

Further, in the 2-step RACH procedure, the BS may combine Msg2 and Msg4 of the 4-step RACH procedure into one message (e.g., MsgB) and transmit the message to the UE (703).

The 2-step RACH procedure may become a low-latency RACH procedure based on the combinations of these messages.

More specifically, MsgA may carry the PRACH preamble included in Msg1 and the data included in Msg3 in the 2-step RACH procedure. In the 2-step RACH procedure, MsgB may carry the RAR included in Msg2 and the contention resolution information included in Msg4.

Resource allocation in the time domain for the PUSCH included in MsgA (MsgA PUSCH) may be performed as follows.

When transmitting MsgA PUSCH in a non-initial UL BWP, if the UE is configured with startSymbolAndLengthMsgAPO, the UE may determine S (start symbol) and L (allocation length) from startSymbolAndLengthMsgAPO.

When transmitting MsgA PUSCH, if the UE is not configured with startSymbolAndLengthMsgAPO, and if the TDRA list PUSCH-TimeDomainResourceAllocationList is provided in PUSCH-ConfigCommon, the UE shall use msgA-timeDomainAllocation to indicate which values are used in the list. If PUSCH-TimeDomainResourceAllocationList is not provided in PUSCH-ConfigCommon, the UE shall use parameters S and L from Table 9 (Default PUSCH time domain resource allocation A for normal CP) where msgA-timeDomainAllocation indicates which values are used in the list.

TABLE 8

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Contention-Free RACH

Figure 7:
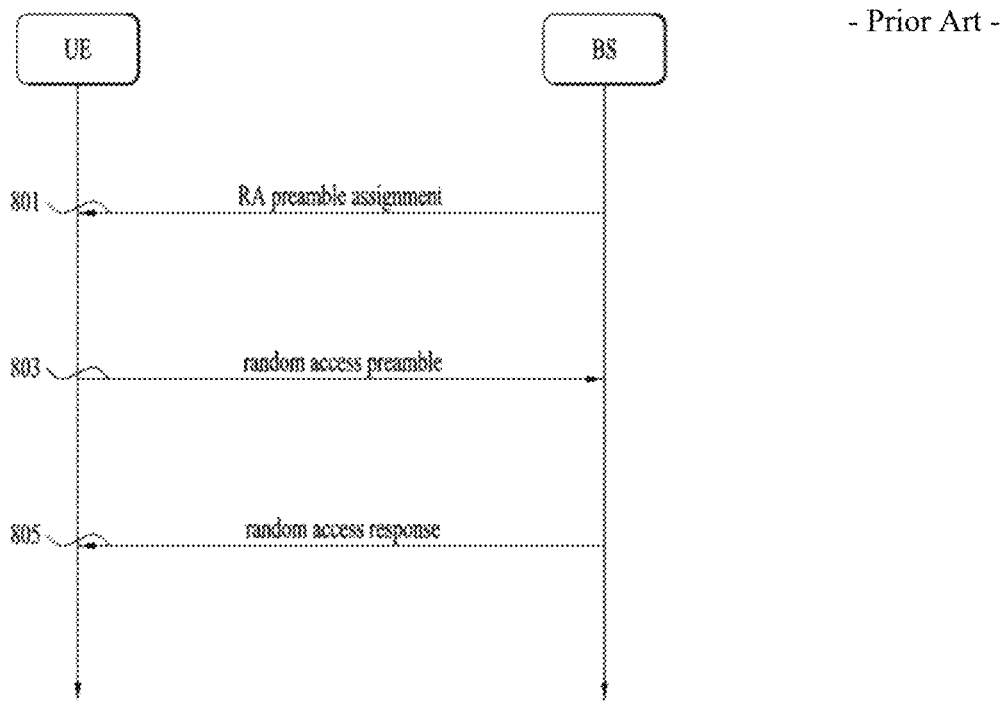
FIG. 7 is a diagram illustrating a contention-free RACH procedure to which various embodiments are applicable.

FIG. 7 is a diagram illustrating an exemplary contention-free RACH procedure to which various embodiments are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (801). Information about the dedicated RACH preamble may be included in an RRC message (e.g., a handover command) or provided to the UE by a PDCCH order. When the RACH procedure starts, the UE transmits the dedicated RACH preamble to the BS (803). When the UE receives an RAR from the BS, the RACH procedure is completed (805).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SystemInformationBlock1 (SIB1).

PRACH Preamble Structure

In the NR system, an RACH signal used for initial access to the BS, that is, for initial access to the BS through a cell used by the BS may be configured using the following elements.

Cyclic prefix (CP): The CP blocks interference from the previous (OFDM) symbol and binds PRACH preamble signals arriving at the BS with different time delays in the same time zone. That is, when a CP is configured to match a maximum cell radius, PRACH preambles transmitted in the same resources by UEs in the cell are inside a PRACH reception window corresponding to a PRACH preamble length configured for PRACH reception by the BS. The length of the CP is generally set equal to or greater than a maximum round trip delay (RTT). The CP may have length TCP.

Preamble (sequence): A sequence is defined for the BS to detect a signal transmission, and a preamble conveys this sequence. The preamble sequence may have length TSEG.

Guard time (GT): The GT is a time period defined to prevent a PRACH signal transmitted from a remotest location of PRACH coverage from the BS and arriving at the BS with a delay from interfering a signal arriving after a PRACH symbol duration. Because the UE does not transmit a signal during this time period, the GT may not be defined as a PRACH signal. The GT may have length TGP.

1.5. UL-DL Timing Relationship

Timing advance maintenance on UL will now be described.

In a system based on OFDM technology, a time required for a signal transmitted by a UE to reach a BS may vary depending on the radius of a cell, the location of the UE within the cell, and/or the moving speed of the UE. That is, if the BS does not separately manage transmission signal timings of respective UEs, there is a possibility that a transmission signal of a UE may interfere with signals transmitted by other UEs, and thus an error rate of signals received by the BS increases.

More specifically, a time consumed for a signal transmitted by a UE attempting to perform transmission at a cell edge to arrive at the BS will be longer than a time required for a signal transmitted by a UE at the center of the cell to arrive at the BS. Conversely, a time required for a signal transmitted by the UE located at the center of the cell to arrive at the BS will be relatively shorter than that of the UE located at the edge of the cell.

Since data or signals that all UEs in the cell transmit should be received within every valid time boundary in order to prevent interference in terms of the BS, the BS needs to appropriately adjust transmission timings of the signals transmitted by the UEs according to situations of the UEs and this adjustment is referred to as timing advance management.

One method of managing a timing advance may be a random access operation. That is, the random access operation causes the BS to receive a random access preamble transmitted by the UE. The BS calculates a timing advance value to make a transmission timing of the UE faster or slower using information about the received random access preamble. Then, the BS informs the UE of the calculated timing advance value through a random access response. The UE updates a UL transmission timing using the timing advance value.

As another method, the BS receives a sounding reference signal (SRS) periodically or randomly transmitted by the UE and calculates the timing advance value for the UE through the received signal. The BS informs the UE of the timing advance value and then the UE updates a transmission timing thereof.

As described above, the BS measures the transmission timing of the UE through the random access preamble or the SRS, calculates a timing value to be corrected, and informs the UE of the timing value to be corrected. The timing advance value (i.e., timing value to be corrected) transmitted by the BS to the UE is referred to as a timing advance command (TAC). The TAC is processed in a MAC layer. Since the UE is not always located at a fixed position, the transmission timing of the UE is changed at every time according to the moving speed of the UE and the location of the UE.

In this regard, upon receiving the TAC once from the BS, the UE needs to assume that the TAC is not always valid for an infinite time but the TAC is valid only for a specific time. A timing advance timer (TAT) is used for this purpose. That is, upon receiving the TAC from the BS, the UE starts the TAT. The UE assumes that a UL timing thereof is synchronized with the BS when the TAT is in operation. The value of the TAT may be transmitted through an RRC signal such as system information or radio bearer reconfiguration. Upon receiving a new TAC from the BS while the TAT is in operation, the UE restarts the TAT. When the TAT expires or the TAT does not operate, the UE does not transmit any UL signals, such as PUSCH and PUCCH signals, except for the random access preamble, under the assumption that the UL timing of the UE is not synchronized with the BS.

Figure 8:
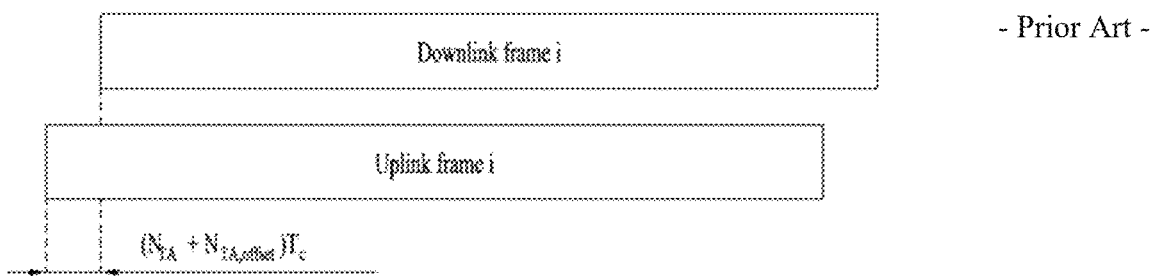
FIG. 8 is a diagram illustrating an exemplary UL-DL timing relationship, which is applicable to various embodiments of the present disclosure.

FIG. 8 is a diagram illustrating an exemplary UL-DL timing relationship applicable to various embodiments of the present disclosure.

Referring to FIG. 8, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ KHz is $N_{TA}$ $(=T_A*16*64/2^\mu)$. $N_{TA}$ is relative to the SCS of a first UL transmission from the UE after reception of a random access response.

In other cases, a TA command, $T_A$ for a TAG indicates adjustment of a current $N_{TA}$ value, $N_{TA\_old}$ to a new $N_{TA}$ value, $N_{TA\_new}$ by index values of $T_A$ $(=0, 1, 2, \ldots, 63)$, where for a SCS of $2^\mu*15$ KHz, $N_{TA\_new}=N_{TA\_old}+(T_A-31)*16*64/2^\mu$.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 9:
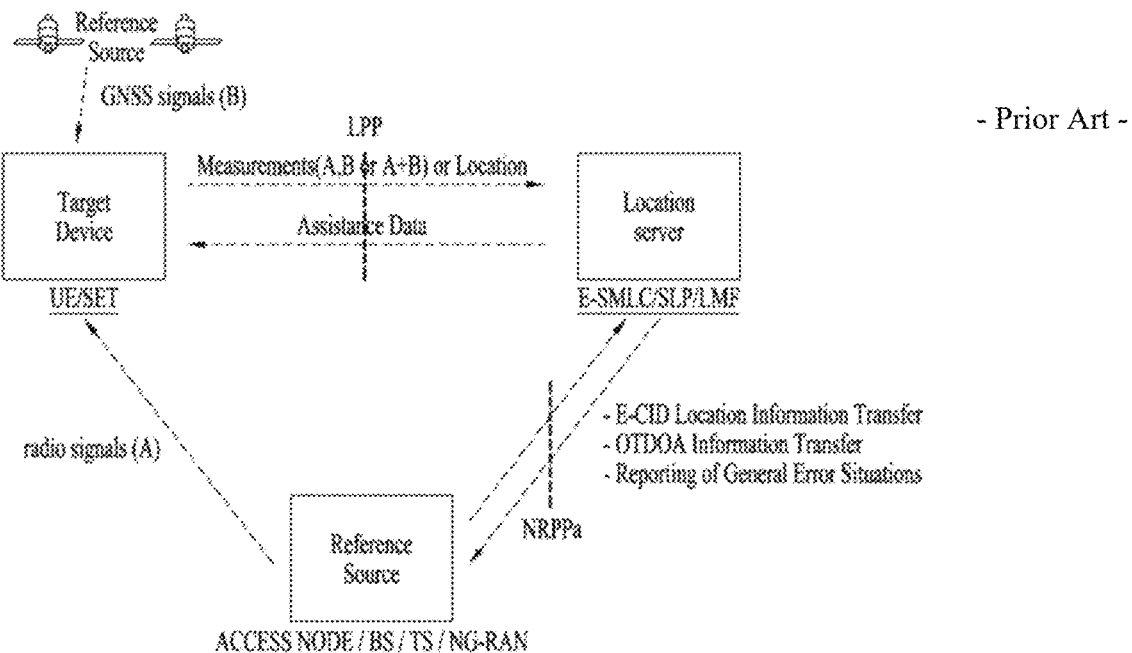
FIG. 9 is a diagram illustrating a positioning protocol configuration for positioning a user equipment (UE), to which various embodiments are applicable.

FIG. 9 is a diagram illustrating an exemplary positioning protocol configuration for positioning a UE, to which various embodiments are applicable.

Referring to FIG. 9, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}\left(N_{symb}^{slot}n_{s,f}^\mu + l + 1\right) \right. \quad \text{[Equation 2]}$$
$$\left. \left(2\left(n_{ID,seq}^{PRS}\bmod 1024\right) + 1\right) + \left(n_{ID,seq}^{PRS}\bmod 1024\right)\right) \bmod 2^{31}$$

$n_{s,f}^\mu$ may be a slot number in a frame in an SCS configuration μ. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k,l) for an antenna port p and the SCS configuration $\mu$.

$$a_{k,l}^{(p,\mu)} = \beta_{PRS}\tau(m) \quad \text{[Equation 3]}$$

$$m = 0, 1, \ldots$$

$$k = mK_{comb}^{PRS} + \left(\left(k_{offset}^{PRS} + k'\right) \bmod K_{comb}^{PRS}\right)$$

$$l = l_{start}^{PRS}, l_{start}^{PRS}+1, \ldots, l_{start}^{PRS}+L_{PRS}-1$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 9.

TABLE 9

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu}n_f + n_{s,f}^\mu - T_{offset}^{PRS} - T_{offset,res}^{PRS}\right) \bmod 2^\mu T_{per}^{PRS} \in \quad \text{[Equation 4]}$$

$$\left\{iT_{gap}^{PRS}\right\}_{i=0}^{T_{rep}^{PRS}-1}$$

$N_{slot}^{frame,\mu}$ may be the number of slots per frame in the SCS configuration $\mu$. $n_f$ may be a system frame number (SFN). $n_{s,f}^\mu$ may be a slot number in a frame in the SCS configuration $\mu$. A slot $T_{offset}^{PRS} \in \{0, 1, \ldots, T_{per}^{PRS}-1\}$ may be given by a higher-layer parameter DL-PRS-ResourceSet-SlotOffset. A DL PRS resource slot offset $T_{offset,res}^{PRS}$ may be given by a higher layer parameter DL-PRS-ResourceSlotOffset. A periodicity $T_{per}^{PRS} \in \{4, 5, 8, 10, 16, 20, 32, 40, 64, 80, 160, 320, 640, 1280, 2560, 5120, 10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture

Figure 10:
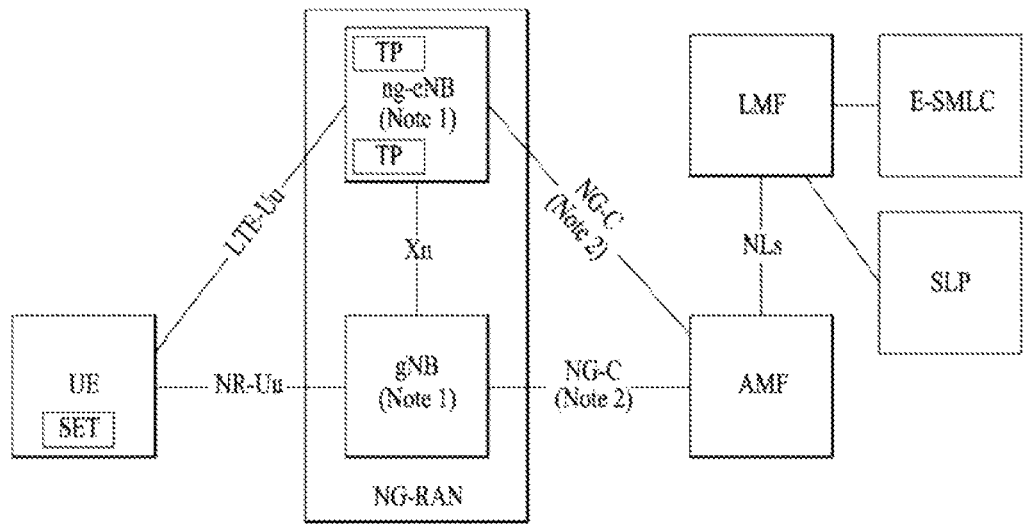
FIG. 10 illustrates an exemplary system architecture for measuring positioning of a UE to which various embodiments are applicable.

FIG. 10 illustrates an exemplary system architecture for measuring positioning of a UE to which various embodiments are applicable.

Referring to FIG. 10, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 11:
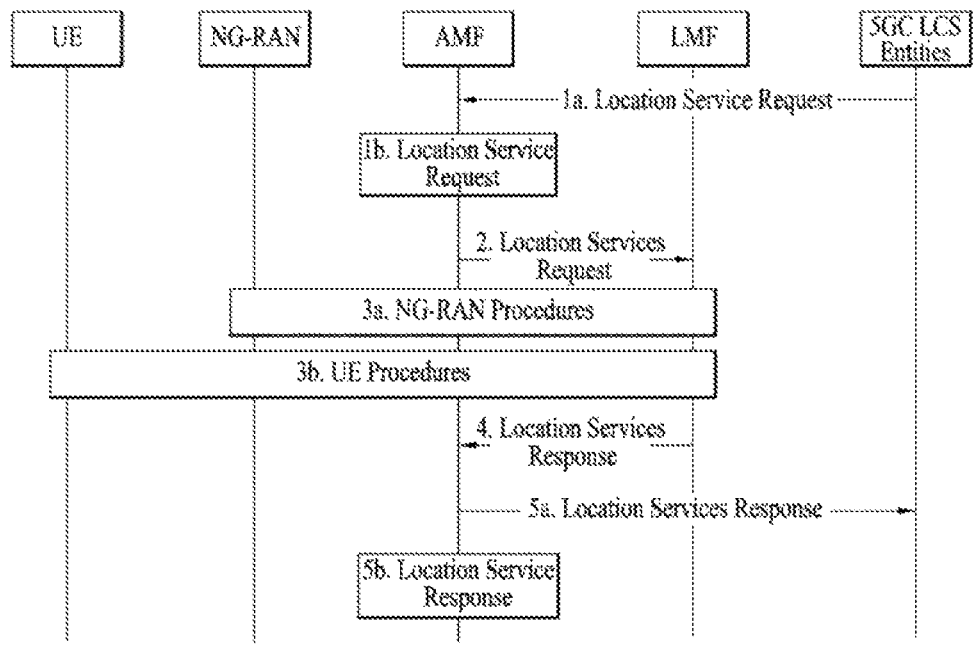
FIG. 11 illustrates an implementation example of a network for UE positioning.

FIG. 11 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 11. In other words, in FIG. 11, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 11 has been initiated by step 1a, the AMF may transfer the location service response to a 5GC entity such as a GMLC. If the procedure of FIG. 11 has been initiated by step 1b, the AMF may use the location service response in order to provide a location service related to an emergency call.

2.5. Positioning Protocol

LTE Positioning Protocol (LPP)

Figure 12:
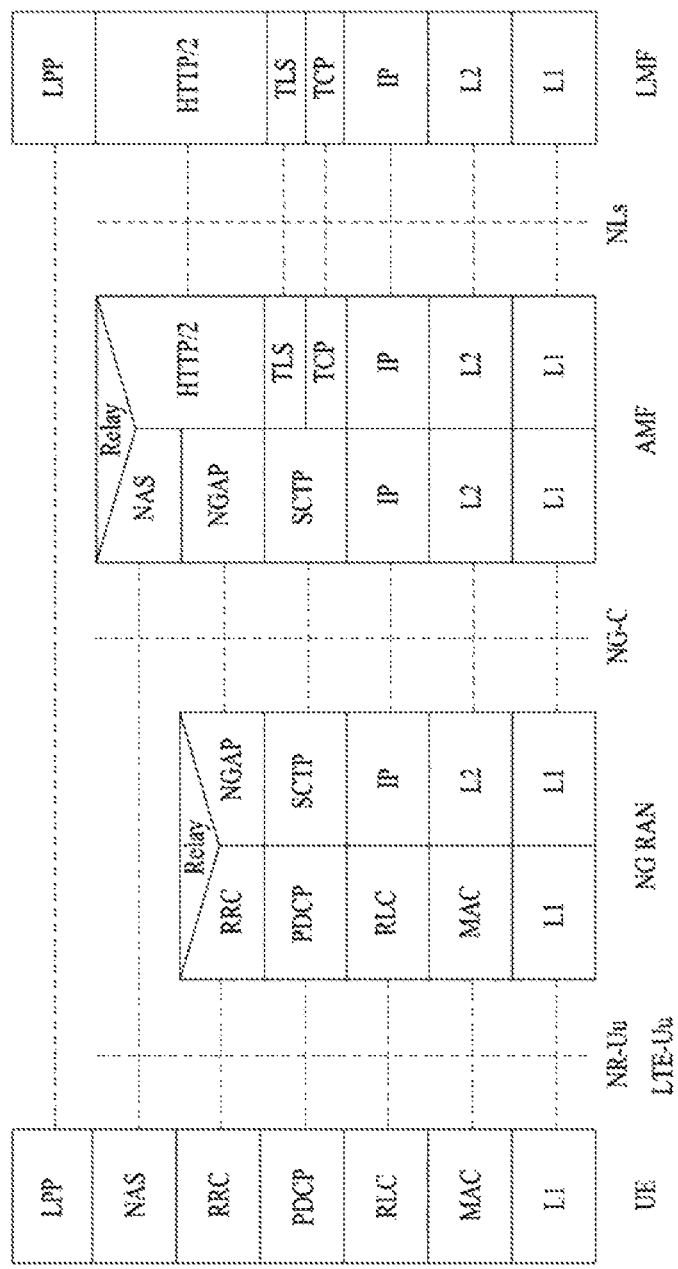
FIG. 12 is a diagram illustrating protocol layers for supporting LTE positioning protocol (LPP) message transmission, to which various embodiments are applicable.

FIG. 12 illustrates an exemplary protocol layer used to support LPP message transfer between an LMF and a UE. An LPP protocol data unit (PDU) may be carried in a NAS PDU between an AMF and the UE.

Referring to FIG. 12, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 13:
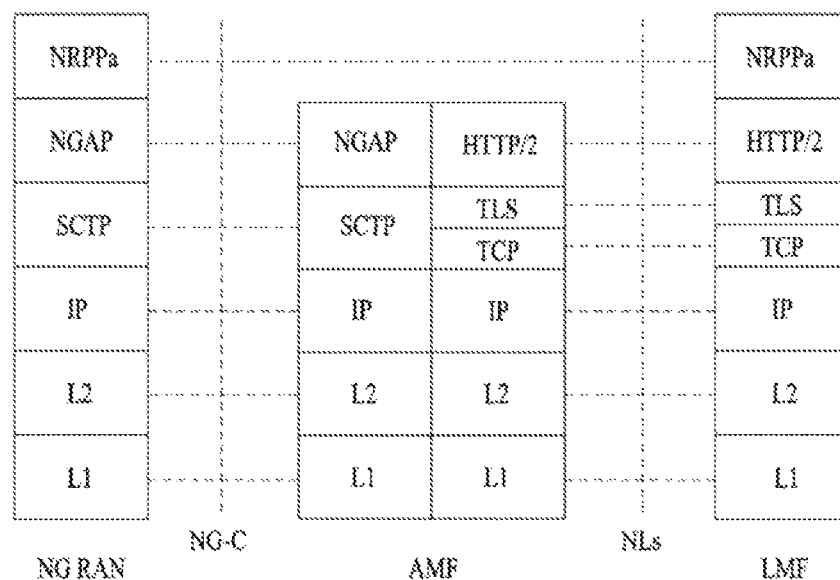
FIG. 13 is a diagram illustrating protocol layers for supporting NR positioning protocol a (NRPPa) protocol data unit (PDU) transmission, to which various embodiments are applicable.

FIG. 13 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

Figure 14:
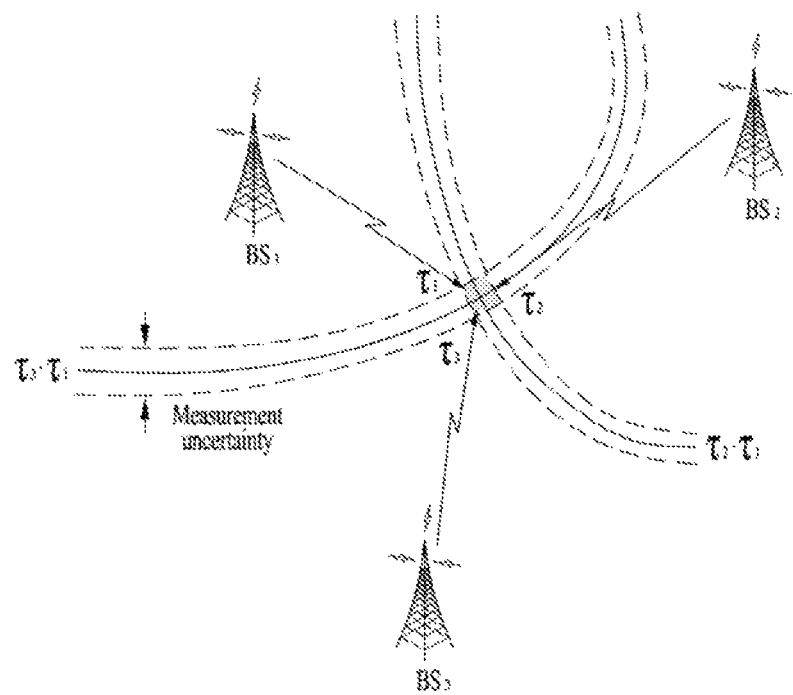
FIG. 14 is a diagram illustrating an observed time difference of arrival (OTDOA) positioning method, to which various embodiments are applicable.

FIG. 14 is a diagram illustrating an observed time difference of arrival (OTDOA) positioning method, to which various embodiments are applicable:

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTD_{i,1} = \frac{\sqrt{(x_t - x_i)^2 + (y_t - y_i)^2}}{c} - \frac{\sqrt{(x_t - x_1)^2 + (y_c - y_1)^2}}{c} + (T_i - T_1) + (n_i - n_1) \quad \text{[Equation 5]}$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_j$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)–transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx–Tx time difference, timing advance (TADV), and/or AoA Here, TADV may be divided into Type 1 and Type 2 as follows.

TADV Type 1=(ng-eNB Rx–Tx time difference)+
(UE E-UTRA Rx–Tx time difference)

TADV Type 2=ng-eNB Rx–Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 15:
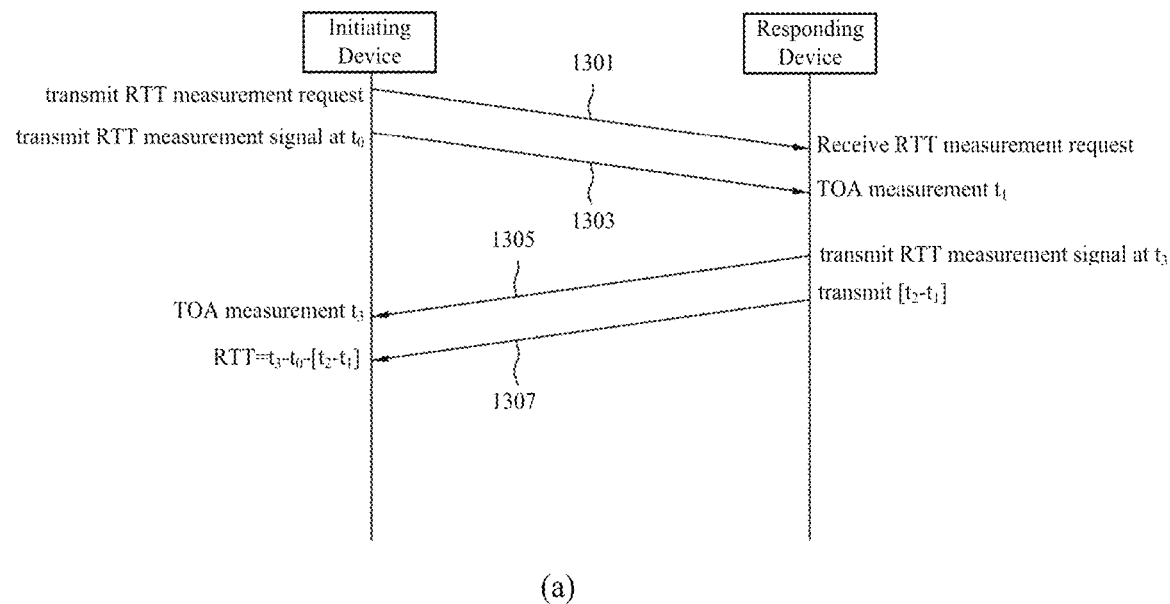
FIG. 15 is a diagram illustrating a multi-round trip time (multi-RTT) positioning method to which various embodiments are applicable.
Figure 15:
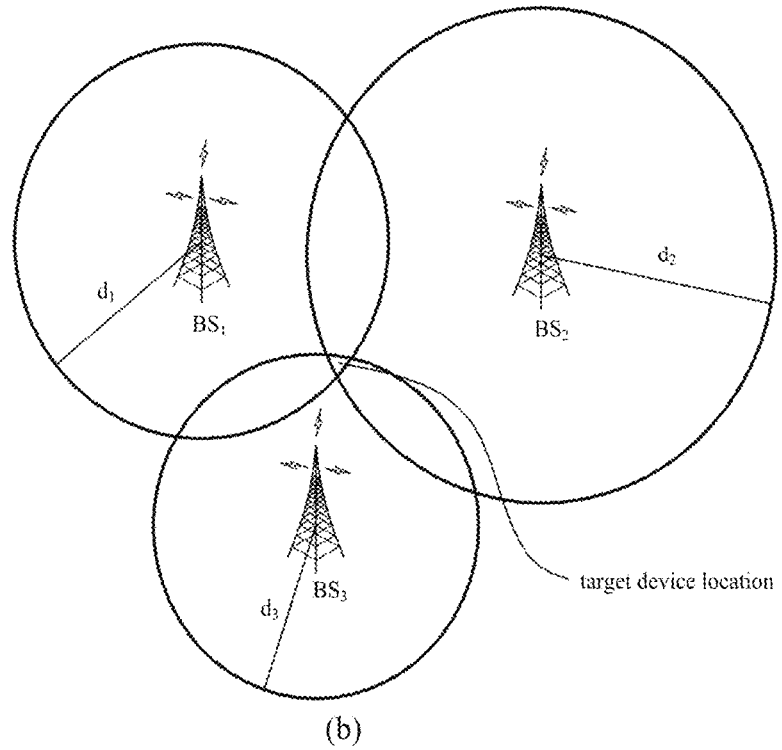

FIG. 15 is a diagram illustrating an exemplary multi-round trip time (multi-RTT) positioning method to which various embodiments are applicable.

Referring to FIG. 15(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1]$$ [Equation 6]

Referring to FIG. 15(b), an RTT may correspond to a double-range measurement between two devices. Positioning estimation may be performed from the corresponding information. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 10 shows an exemplary SRS request field.

TABLE 10

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-POCCH-Group set to 'typeA' |
| --- | --- | --- |
| 00 | No aperiodic SRS resource set triggered | No operiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resource Type in SRS-ResourceSet set to 'aperiodic' for a $1^{st}$ set of serving cells configured by higher layers |
| 10 | SRS resource set(s) configured by SRS-ResourceSet with higher layer parameter aperiodicSRS-ResourceTrigger set to 2 of an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-Resource Set set to 'antennaSwitching' and resource Type in SRS-Resource Sef set to 'aperiodic' for a $2^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResource Set with an entry in aperiodicSRS-ResourceTriggerList set to 3 when triggered by DCI formats 0_1, 0_2, 1_1 and 1_2 | SRS resource set(s) configured with higher layer parameter usage in SRS-ResourceSet set to 'antennaSwitching' and resource Type in SRS-ResourceSet set to 'aperiodic' for a $3^{rd}$ set of serving cells configured by higher layers |

In Table 10, srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

AOA (AoA): angle of arrival

LMF: location management function

MAC: medium access control

MAC-CE: MAC-control element

PRS: positioning reference signal

RS: reference signal

RTT: round trip time

RSRP: reference signal received power

RSRQ: reference signal received quality

RSTD: reference signal time difference/relative signal time difference

Rx–Tx time difference: receive-transmit time difference (/time difference between reception and transmission)

1) UE Rx–Tx time difference: According to various embodiments, a UE Rx–Tx time difference may be defined by $T_{UE\text{-}RX} - T_{UE\text{-}TX}$. According to various embodiments, $T_{UE\text{-}RX}$ denotes a timing at which a UE receives DL subframe (and/or frame/slot/symbol, etc.) #i from a positioning node, which may be defined by a first detected path in time. According to various embodiments, $T_{UE\text{-}TX}$ denotes a timing at which a UE transmits UL subframe (and/or frame/slot/symbol, etc.) #j closest in time to subframe (and/or frame/slot/symbol, etc.) #i received from a positioning node (where i and j are indices, each of which may have an integer value greater than or equal to 0). According to various embodiments, one or multiple DL PRS resources may be used to determine the start of one subframe (and/or frame/slot/symbol, etc.) on a first arrival path of the positioning node.

2) gNB Rx–Tx time difference: According to various embodiments, a gNB Rx–Tx time difference may be defined by $T_{gNB-RX}-T_{gNB-TX}$. According to various embodiments, $T_{gNB-RX}$ denotes a timing at which a positioning node receives UL subframe (and/or frame/slot/symbol, etc.) #i including a sounding reference signal (SRS) associated with a UE, which may be defined by a first detected path in time. According to various embodiments, $T_{gNB-TX}$ denotes a timing at which a positioning node transmits DL subframe (and/or frame/slot/symbol, etc.) #j closest in time to subframe (and/or frame/slot/symbol, etc.) #i received from a node (where i and j are indices, each of which may have an integer value greater than or equal to 0). According to various embodiments, one or multiple SRS resources for positioning may be used to determine the start of one subframe (and/or frame/slot/symbol, etc.) including an SRS. According to various embodiments, a gNB may be replaced with an eNB/base station (BS)/TRP, etc.

SINR: signal to interference plus noise ratio

SNR: signal to noise ratio

SRS: sounding reference signal. According to various embodiments, the SRS may be used for UL channel estimation based on multi input multi output (MIMO) and for positioning measurement. In other words, according to various embodiments, the SRS may include a normal SRS and a positioning SRS. According to various embodiments, the positioning SRS may be understood as a UL RS configured for positioning of a UE and/or used for positioning of the UE. According to various embodiments, the normal SRS is contrasted with the positioning SRS, and may be understood as a UL RS configured for UL channel estimation and/or used for UL channel estimation (and/or configured for UL channel estimation and positioning and/or used for UL channel estimation and positioning). According to various embodiments, the positioning SRS may also be referred to as an SRS for positioning or the like. In the description of various embodiments, terms such as positioning SRS and SRS for positioning may be used interchangeably and may be understood as the same. According to various embodiments, the normal SRS may also be referred to as a legacy SRS, a MIMO SRS, an SRS for MIMO, or the like. In the description of various embodiments, terms such as normal SRS, legacy SRS, MIMO SRS, and SRS for MIMO may be used interchangeably and may be understood as the same. For example, the normal SRS and the positioning SRS may be configured/indicated separately. For example, the normal SRS and the positioning SRS may be configured/indicated from different information elements (IEs) of a higher layer. For example, the normal SRS may be configured based on SRS-resource. For example, the positioning SRS may be configured based on SRS-PosResource. In the description of various embodiments, the positioning SRS may be understood as an example of the UL PRS.

TA: timing advance/time advance

TDOA (TDoA): timing difference of arrival

TOA (ToA): time of arrival

TRP: transmission and reception point (TP: transmission point)

UTDOA (UTDoA): uplink time difference of arrival

In the description of various embodiments, the term "BS" may be understood as an umbrella term including a remote radio head (RRH), an eNB, a NB, a TP, a reception point (RP), a relay, etc.

In the description of various embodiments, the expression "exceeding/greater than or equal to A" may be replaced with "greater than or equal to/exceeding A."

In the description of various embodiments, the expression "less than/less than or equal to B" may be replaced with "less than or equal to/less than B."

Unless specifically stated otherwise, in the description of various embodiments, a PRS resource may be replaced with a PRS resource set, and a PRS resource set may be replaced with a PRS resource.

Unless specifically stated otherwise, in descriptions of various embodiments, an SRS resource may be replaced with an SRS resource set, and an SRS resource set may be replaced with an SRS resource.

For example, the LTE DL PRS signal may be an "always-on" cell-specific broadcast signal. For example, in NR, "always-on" transmission may be minimized in consideration of network energy efficiency. Accordingly, an NR DL PRS transmitted when necessary by the UE may be required. For example, it may be applied even in the case of the SRS.

Various embodiments may relate to on-demand type RS (reference signal) configuration and/or measurement reporting requested by the UE to the network. Various embodiments may relate to standard and/or implementationally required technical attributes in consideration of effective resource management and/or positioning latency.

For example, support for on-demand requests for both DL PRS and UL SRS may be required to support on-demand multi-RTT. For example, the on-demand request information of the UE may include a specific PRS (SRS) pattern, periodicity, bandwidth (BW), and on/off. For example, considering efficiency and latency performance, an on-demand request for on/off behavior of the PRS/SRS may be transmitted and received on PUCCH.

For example, an aperiodic PRS may be supported in response to the on-demand request for PRS. For example, a DCI-triggered aperiodic PRS may be supported.

Figure 16:
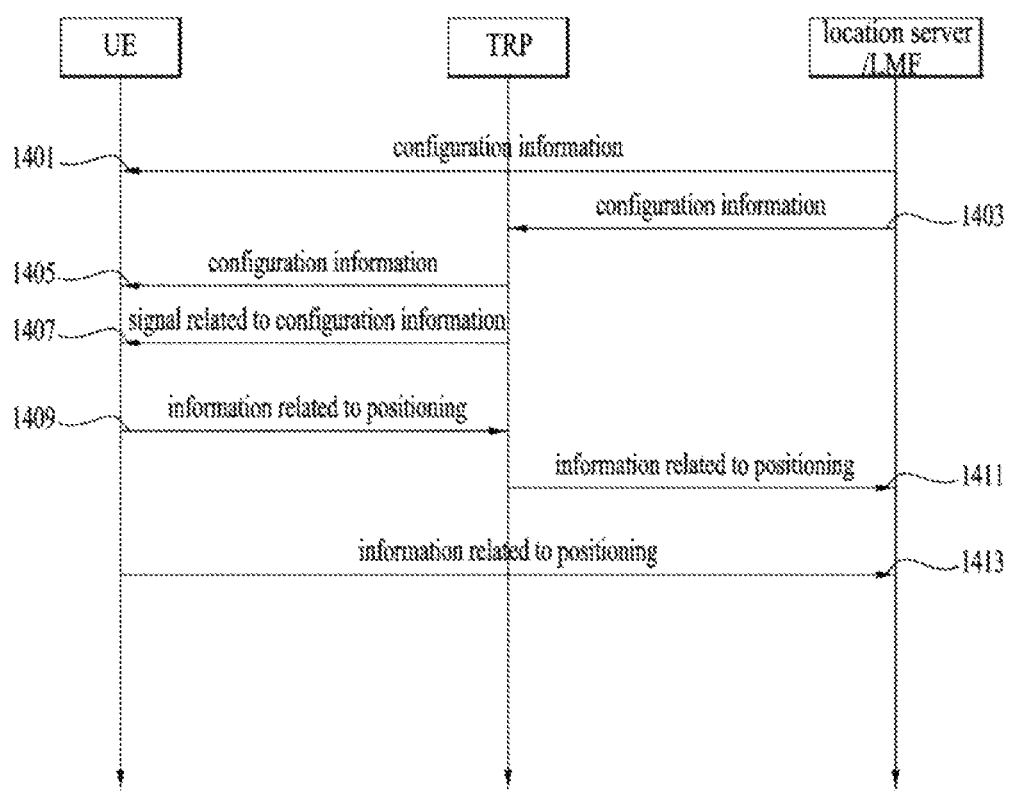
FIG. 16 is a simplified diagram illustrating a method of operating a UE, a transmission and reception point (TRP), a location server, and/or a location management function (LMF) according to various embodiments.

FIG. 16 is a simplified diagram illustrating an operating method of a UE, a TRP, a location server, and/or an LMF according to various embodiments.

Referring to FIG. 16, in operation 1401 according to various embodiments, the location server and/or the LMF may transmit configuration information to the UE, and the UE may receive the configuration information.

In operation 1304 according to various embodiments, the location server and/or the LMF may transmit reference configuration information to the TRP, and the TRP may receive the reference configuration information. In operation 1405 according to various embodiments, the TRP may transmit the reference configuration information to the UE, and the UE may receive the reference configuration information. In this case, operation 1401 according to various embodiments may be omitted.

In contrast, operations 1403 and 1405 according to various embodiments may be omitted. In this case, operation 1301 according to various embodiments may be performed.

That is, operation 1401 according to various embodiments, and operations 1403 and 1405 according to various embodiments may be selectively performed.

In operation 1407 according to various embodiments, the TRP may transmit a signal related to the configuration information, and the UE may receive the signal related to the configuration information. For example, the signal related to the configuration information may be a signal for positioning of the UE.

In operation 1409 according to various embodiments, the UE may transmit a signal related to positioning to the TRP, and the TRP may receive the signal related to positioning. In operation 1411 according to various embodiments, the TRP may transmit the signal related to positioning to the location server and/or the LMF, and the location server and/or the LMF may receive the signal related to positioning.

In operation 1413 according to various embodiments, the UE may transmit the signal related to positioning to the location server and/or the LMF, and the location server and/or the LMF may receive the signal related to positioning. In this case, operations 1409 and 1411 according to various embodiments may be omitted.

In contrast, operation 1413 according to various embodiments may be omitted. In this case, operations 1409 and 1411 according to various embodiments may be performed.

That is, operations 1409 and 1411 according to various embodiments, and operation 1413 according to various embodiments may be selectively performed.

According to various embodiments, the signal related to positioning may be obtained based on the configuration information and/or the signal related to the configuration information.

Figure 17:
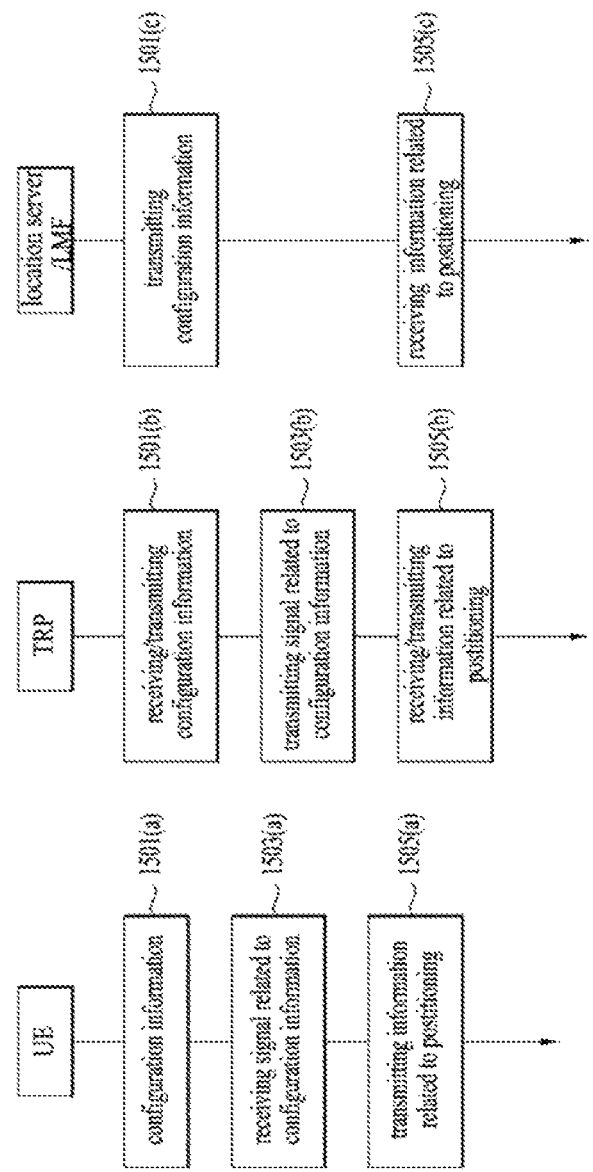
FIG. 17 is a simplified diagram illustrating a method of operating a UE, a TRP, a location server, and/or an LMF according to various embodiments.

FIG. 17 is a simplified diagram illustrating an operating method of a UE, a TRP, a location server, and/or an LMF according to various embodiments.

Referring to FIG. 17, in operation 1501 (*a*) according to various embodiments, the UE may receive configuration information.

In operation 1503(*a*) according to various embodiments, the UE may receive a signal related to the configuration information.

In operation 1505(*a*) according to various embodiments, the UE may transmit information related to positioning.

Referring to FIG. 17, in operation 1501(*b*) according to various embodiments, the TRP may receive configuration information from the location server and/or the LMF and transmit the configuration information to the UE.

In operation 1503(*b*) according to various embodiments, the TRP may transmit a signal related to the configuration information.

In operation 1505(*b*) according to various embodiments, the TRP may receive information related to positioning and transmit the information related to positioning to the location server and/or the LMF.

Referring to FIG. 17, in operation 1501(*c*) according to various embodiments, the location server and/or the LMF may transmit configuration information.

In operation 1505(*c*) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below:

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Proposal #1: On-Demand SRS for Positioning

According to various embodiments, a UE may request SRS resource and/or SRS resource set configurations from a BS/location server/LMF. For example, the SRS may be an SRS for positioning.

For example, considering a 4-step random access procedure, a specific RACH preamble/sequence may be used for SRS resource configuration and/or SRS resource transmission triggering. For example, if the UE transmits the specific RACH preamble/sequence, the BS/location server/LMF may recognize that the UE has requested SRS resource configuration/transmission. For example, this scheme may be usefully applied to an RRC idle/inactive UE desiring a positioning service.

Additionally/alternatively, for example, considering a 2-step random access procedure, Msg #A may be used for SRS resource configuration and/or SRS resource transmission triggering.

Additionally/alternatively, for example, the UE may request both PRS and SRS (positioning SRS) resource configuration through an on-demand type transmission. For example, when the UE transmits a specific sequence in connection with transmission of a specific RACH preamble and/or sequence, the BS/location server/LMF may recognize that the UE requests/requires both the positioning SRS (UL-PRS) and DL-PRS configurations.

For example, three dedicated/independent RACH preambles/sequences may be used/allocated.

For example, one preamble/sequence may be used for the UE to request the DL-PRS configuration.

For example, another one may be used for the UE to request the UL-PRS (SRS for positioning) configuration.

For example, the other one may be used for the UE to request that both UL-PRS and DL-PRS be configured.

For example, the UE may make a request to the BS/location server/LMF for SRS transmission and/or SRS resource configuration for SRS transmission through a specific field/bit/resource and/or PUSCH (resource) of PUCCH. In the description of the various embodiments, the UE's request for SRS (transmission) may include the UE's request for SRS resource/resource set configuration for SRS transmission.

Additionally/alternatively, for example, the UE may request transmission of a UL-PRS (e.g., positioning SRS) while notifying the BS/location server/LMF that the UE needs a positioning service. In the description of various embodiments, this type of transmission may be referred to as on-demand SRS transmission.

Additionally/alternatively, for example, the UE may make a request for SRS resources/transmission as well as a request for PRS resources/transmission to the BS/location server/LMF for positioning. For example, the UE may make a request for both SRS and PRS transmissions/configurations to the BS/location server/LMF using a specific RACH preamble/sequence. According to the various embodiments, considering that both DL PRS and UL SRS are used in multi-cell round trip time (RTT) based UE positioning, both DL PRS and UL SRS may be configured.

Proposal #2: Specific Request for On-Demand SRS Transmission

According to various embodiments, the UE may request/recommend one or more of the following attributes/parameters/information elements (IEs) related to SRS while making a request for SRS resource/resource set configuration/transmission to the BS/location server/LMF. For example, the SRS may be positioning SRS that may be dedicated to positioning measurement of the UE.
1) Positioning technique preferred by the UE
   UL only based techniques such as UTDOA
   UL and DL based techniques such as multi-RTT
2) Number of cells/BSs/TRPs required for UE positioning
3) Specific transmission beam information preferred by the UE and/or information about the transmission panel/antenna group of the UE may be included. For example, the UE may request a specific beam direction. For example, the UE may request configuration of an SRS resource and/or an SRS resource set to be used at a specific transmission panel of the UE.
4) Specific target cell/BS/TRP
   For example, the UE may request a specific target cell/BS/TRP. For example, the request may be construed as indicating all a cell/BS/TRP preferred by the UE for positioning. For example, based on measurement of a DL RS transmitted from a specific cell/BS/TRP, the UE may inform that a cell/BS/TRP for which a LoS signal path is more visible a certain level and/or relatively visible is preferred.
5) Number of SRS resources and/or SRS resource sets
   Resources may be prevented from being excessively configured for the UE, and excessively insufficient SRS resources may be prevented from being configured. Thereby, efficient resource configuration/utilization may be implemented.
6) Number of repetitive transmissions in which the SRS resource and/or SRS resource set will be repeatedly transmitted
   The BS/location server/LMF may configure/instruct SRS resources and/or SRS resources in a SRS resource set to be consecutively/non-consecutively and repeatedly transmitted N (>=1) times over several subframes and/or slots (e.g., intra-slots and/or inter-slots).
   For example, considering SRS coverage and the like, the number of repetitive transmissions may be essential when the UE makes a request for SRS resource configuration/transmission to a distant cell/BS/TRP.
   For example, when the BS/location server/LMF configures a specific SRS resource and/or SRS resource set to be repeatedly transmitted, the BS/location server/LMF may configure muting and/or zero-power transmission at a specific repeated transmission time of the SRS resource and/or SRS resource set. For example, when a specific SRS resource is repeatedly transmitted 4 times, the BS/location server/LMF may configure the same to be transmitted at zero power at odd-numbered times. For example, the BS may configure/indicate the same to the UE through dynamic signaling such as DCI/MAC-CE.
   For example, when the BS/location server/LMF configures a specific SRS resource and/or SRS resource set to be repeatedly transmitted, the BS/location server/LMF may configure/indicate, through DCI/MAC-CE signal or the like, the transmission power of the UE to be used at a specific repetition time. For example, the UE may be configured/instructed to change the transmission power according to the repeated transmission timing even when the UE transmits the same SRS resource.
   For example, while a specific SRS resource and/or SRS resource set is repeatedly transmitted, the UE may not change the transmission timing for the SRS resource and/or the SRS resource set. For example, the UE may ignore the timing advance ($T_A$) indicated/configured by the BS/location server/LMF and prioritize the $T_A$ that is currently in use. For example, while repeatedly transmitting the SRS resource and/or SRS resource set, the UE may maintain the transmission timing rather than changing the same over time. For example, the SRS may be a positioning SRS. For example, the UE may maintain the SRS transmission timing, but comply with the $T_A$ indication/configuration indicated by the BS for the transmission timing for other UL signals such as PUSCH/PUCCH. For example, the existing $T_A$ may be applied for SRS transmission (positioning SRS) and/or the transmission timing thereof may be maintained to be constant, while the transmission timing of other UL signal transmissions may be changed.
7) Bandwidth and/or periodicity of SRS resource and/or SRS resource set
   For example, the UE may request appropriate resources according to the required positioning accuracy level. For example, waste of resources, which may occur when the BS/location server/LMF configures excessively many resources while the UE does not need many resources, may be prevented. For example, a latency issue, which may occur when the BS/location server/LMF allocates insufficient bandwidth resources and thus additional resource allocation needs to be configured while the UE requires a relatively high level of accuracy and requires SRS resources of a large bandwidth, may be prevented.

Proposal #3: Specific Request for On-Demand PRS Transmission

According to various embodiments, the UE may request/recommend one or more of the following attributes/parameters/IEs related to PRS while requesting PRS resource(s)/resource-set(s) configuration/transmission.
1) Number of cells/BSs/TRPs required for UE positioning
2) Specific reception beam information preferred by the UE (which may include panel/antenna group information about the UE). For example, the UE may request a specific beam direction.
3) Specific target cell/BS/TRP
   For example, the UE may request a specific target cell/BS/TRP. For example, the request may be construed as indicating all a cell/BS/TRP preferred by the UE for positioning. For example, based on measurement of a DL RS transmitted from a specific cell/BS/TRP, the UE may inform that a cell/BS/TRP for which a LoS signal path is more visible a certain level and/or relatively visible is preferred.
4) Number of PRS resources and/or PRS resource sets
  Resources may be prevented from being excessively configured for the UE, and excessively insufficient PRS resources may be prevented from being configured. Thereby, efficient resource configuration/utilization may be implemented.
5) Number of repetitive transmissions in which the PRS resource and/or PRS resource set will be repeatedly transmitted
  For example, considering PRS coverage and the like, the number of repetitive transmissions may be essential when the UE makes a request for PRS resource configuration/transmission to a distant cell/BS/TRP.
6) Bandwidth and/or periodicity of PRS resource and/or PRS resource set
  For example, the UE may request appropriate resources according to the required positioning accuracy level. For example, waste of resources, which may occur when the BS/location server/LMF configures excessively many resources while the UE does not need many resources, may be prevented. For example, a latency issue, which may occur when the BS/location server/LMF allocates insufficient bandwidth resources and thus additional resource allocation needs to be configured while the UE requires a relatively high level of accuracy and requires SRS resources of a large bandwidth, may be prevented.

Proposal #4: On-Demand Reporting

According to various embodiments, the UE may make a request for SRS/PRS resource/resource set configuration to the BS/location server/LMF for UE positioning based on one or more of the above-described embodiments. For example, a specific RACH preamble/sequence may be used.

1) On-Demand Reporting

According to various embodiments, the UE may make a request to the BS/location server/LMF for a time-frequency resource (e.g., PUSCH/PUCCH) that is to be used to report positioning measurement (e.g., timing measurement (e.g., RSTD/UE RX-TX time difference measurement, RSRP/SINR/SNR measurement)) used for UE positioning to the BS/location server/LMF. For example, the UE may request the above information using Msg #1 (RACH preamble/sequence) and/or Msg #3 in the 4-step random access procedure. Additionally/alternatively, for example, Msg #A of a 2-step RACH may be used.

2) On-Demand RS Configuration+Reporting

According to various embodiments, while requesting SRS/PRS resource configuration (on-demand type SRS/PRS), the UE may request a resource for reporting measurement.

For example, when a specific RACH sequence is used, the UE may request SRS/PRS resource configuration. Additionally/alternatively, for example, when the UE allocates another RACH sequence and uses this sequence, it may request not only SRS/PRS resource configuration, but also configuration/indication of time-frequency resources for reporting measurement.

For example, as the importance of end-to-end and/or physical-layer latency in UE positioning increases, it may be important to reduce the latency required from the time (positioning triggering time) when a request for positioning of the UE is triggered to the time when the UE/BS/location server finally acquires the location of the UE. Therefore, for example, it may be important to reduce the time required for the UE to acquire and report a measurement for positioning. For example, as the UE receives reporting resource configuration upon requesting necessary SRS resource configuration, the latency may be reduced compared to a procedure in which the RS resources and reporting resources are independently allocated.

Proposal #5: Network Resource Efficiency

According to various embodiments, the BS/location server/LMF may configure/indicate a periodic SRS (and/or UL-PRS) resource and/or SRS (and/or UL-PRS) resource set to the UE. For example, the SRS may be a dedicated SRS/UL-RS resource used for positioning of the UE.

For example, the BS/location server/LMF may not need to continuously receive SRS/UL-PRS resources from the UE when sufficient timing measurement is obtained using the SRS periodically transmitted by the UE. In this case, for example, the BS/location server/LMF may cancel/trigger expiration of some and/or all of the preconfigured periodic SRS/UL-PRS resources. For example, the location server/LMF may cancel/trigger expiration of SRS/UL-PRS resources and inform the BS thereof. For example, the BS may not perform measurement of SRS/UL-PRS transmitted by the UE after signaling of the location server/LMF.

Additionally/alternatively, for example, the UE may request/recommend recovery/cancellation/expiration of some and/or all of the preconfigured SRS resources and/or SRS resource sets to the BS/location server/LMF.

Additionally/alternatively, for example, the BS/location server/LMF may configure/instruct the UE to transmit an SRS/UL-PRS resource and/or SRS/UL-PRS resource set in an opportunistic/adaptive/selective manner. For example, the UE may selectively transmit the SRS configured for positioning at a specific time. For example, the UE may request the BS to cancel/trigger expiration of/recover resources among the resources configured to transmit the SRS resource opportunistically. Additionally/alternatively, for example, the UE may request/recommend to the BS that the location server/LMF cancel/trigger expiration of/recover the resources.

For example, continuously allocating resources that may be opportunistically used by the UE may be very inefficient because time-frequency resources are exclusively reserved in terms of the network. For example, when the location server/LMF and/or the UE sufficiently know the location of the UE to a certain level or more, reserving selectively available time-frequency resources may inefficient in terms of network resource utilization as mentioned above. According to the operation of the UE/BS/location server according to various embodiments, this issue may be addressed.

Proposal #6: Network Resource Efficiency

According to various embodiments, the BS/location server/LMF may establish UE-specific configuration for the DL PRS.

1) For example, the BS/location server/LMF may cancel/recover/trigger expiration of some and/or all of the PRS resources and/or PRS resource sets preconfigured/indicated to a specific UE. For example, to this end, the BS/location server/LMF may indicate/configure recovery/cancellation/expiration of preconfigured PRS resources after a specific time to the UE through a dynamic signal such as MAC-CE/DCI.

2) For example, the UE may request/recommend that the BS/location server/LMF cancel/recover/trigger expiration of the preconfigured PRS resources and/or PRS resource sets. As a more specific example, the UE may request that cancellation/recovery/expiration of PRS resources be performed after a specific time. Additionally/alternatively, for example, the UE may inform that it will not perform measurement on a PRS resource and/or PRS resource set transmitted after a specific time.

For example, in terms of network overhead, the amount of time/frequency resources used by several cells/BSs/TRPs to transmit PRSs may be considerably larger beyond a specific level. For example, since DL data may be transmitted using a time-frequency resource for transmission of a PRS, the resource may be considered as overhead from the perspective of a wireless network. For example, when only a specific UE needs a positioning service and the UE sufficiently performs PRS measurement as not to require additional measurement, the UE may not need to transmit a PRS any more after a specific time.

The SRS, SRS resource, and/or SRS resource set mentioned in the description of various embodiments may be a positioning SRS for UE positioning. Unless specifically stated otherwise, various embodiments relate to UL RSs used for UE positioning, and SRSs may be UL PRSs in descriptions of the various embodiments.

Various embodiments are not limited to the positioning SRS. For example, various embodiments may be applied to an SRS used in MIMO for channel estimation and beam management. For example, the MIMO SRS may also be used/utilized for UE positioning.

The SRS mentioned in the description of various embodiments may represent a UL-RS (for positioning/purposes other than the positioning).

The DL-PRS mentioned in the description of various embodiments may represent a DL-RS (for positioning/purposes other than the positioning).

Details Related to Panels

Details related to the "panels" applicable to the various embodiments described above will be described.

According to various embodiments, the term "panel" may refer to a groups of multiple antenna elements of the UE.

According to various embodiments, an antenna panel/antenna group may be identified by a specific ID/index. Additionally/alternatively, according to various embodiments, the antenna panel/antenna group may be identified/recognized by the ID of a specific UL RS (e.g., SRS) resource set. For example, the ID/index of the specific SRS resource set may be an ID/index for identifying a specific panel of the UE.

In the description of various embodiments, the panel of the UE may mean a panel for transmitting signals (TX panel) and a panel for receiving signals (RX panel).

The use of an antenna panel of a UE applicable to various embodiments will be described.

For example, a panel of the UE suitable for each cell/BS/TRP may vary according to the orientation/position of the UE and/or the orientation/position of the cell/BS/TRP. Accordingly, for example, a specific panel of the UE suitable for signal transmission/reception with a specific cell/BS/TRP may be selectively used at a specific time. Additionally/alternatively, for example, antenna panels of the UE suitable for cells/BSs/TRPs may be simultaneously used for simultaneous wireless communication of the different cells/BSs/TRPs.

For example, when there is only one panel of the UE at a specific position, the beam direction that may be formed on the panel of the UE may not be suitable for a cell/BS/TRP that needs to transmit and receive a radio signal. That is, for example, a decrease in data transfer rate and/or a decrease in measurement accuracy between the UE and the cell/BS/TRP may be caused.

Therefore, for example, it may be necessary to mount multiple antenna panels at various positions (e.g., corners/faces) of the UE such as a smartphone. However, for example, timing delay may vary due to different lengths cables connected between different antenna panels and the modem. Therefore, for example, it may be necessary to overcome/compensate for such delay characteristics in UE positioning.

For example, even for the same TRP, a timing measurement related to positioning may vary for each panel of the UE due to a group delay, depending on the hardware characteristics of the antenna panel of the UE. Therefore, which antenna panel the UE uses to measure the reference timing may be important in positioning, and various embodiments may be considered as a solution.

In the description of various embodiments, a panel of the UE may be multiple antenna elements, and/or a group/configure of antenna elements mounted on the UE. For example, the panel of the UE may be a specific physical panel/antenna group. For example, for the panel of the UE, a logical bundle of multiple antennas may be used as one group. In the description of various embodiments, the panel of the UE may be expressed as an "antenna group" or an "antenna element" in addition to the "panel". According to various embodiments, a method of separating/distinguishing an antenna group by grouping antenna elements and assigning a specific identifier/ID thereto may be introduced. According to various embodiments, a plurality of antenna elements may be distributed into one or more groups, and the one or more groups may be identified/distinguished from each other by the specific identifier/ID.

Multiple Panels

Hereinafter, multiple panels (multi-panel) according to various embodiments will be described. For example, the various embodiments may be related to multi-panel operations/multi-panel definitions/multi-panel related details.

According to various embodiments, the term "panel" may refer to a group of multiple antenna elements.

Additionally/alternatively, in the description of various embodiments, the term "panel" may mean one or more panels (at least one panel and/or multiple panels) and/or a panel group (having a similarity/common value in terms of specific characteristics (e.g., TA, power control parameters, etc.)).

Additionally/alternatively, in the description of various embodiments, the term "panel" may mean one or more antenna ports (at least one antenna port and/or multiple antenna ports), an antenna port group, and/or a UL resource group/set (having a similarity/common value in terms of specific characteristics (e.g., TA, power control parameters, etc.) (e.g., when the difference between values related to the specific characteristic is within a predetermined range and/or below a predetermined threshold)).

Additionally/alternatively, in the description of various embodiments, the term "panel" may mean one or more beams (at least one beam and/or multiple beams), an antenna port group, and/or one or more beam groups/sets (at least one beam group/set and/or multiple beam groups/sets) (having a similarity/common value in terms of specific characteristics (e.g., TA, power control parameters, etc.)).

Additionally/alternatively, in the description of various embodiments, the term "panel" may be defined as a unit for the UE to configure/set a Tx/Rx beam. For example, the term "Tx panel" may be defined as a unit for using one beam among a plurality of Tx beams, which are generated by one panel, for transmission at a specific time. That is, only one Tx beam (e.g., spatial relation information RS) may be used for each Tx panel to transmit a specific UL signal/channel.

Additionally/alternatively, in the description of various embodiments, the term "panel" may mean one or more antenna ports (at least one antenna port and/or multiple antenna ports), an antenna port group, and/or a UL resource group/set having common/similar UL synchronization (e.g., when the difference in UL synchronization is less than or equal to a predetermined range/threshold).

Additionally/alternatively, in the description of various embodiments, the term "panel" may be replaced with an uplink synchronization unit (USU) in general.

Additionally/alternatively, in the description of various embodiments, the term "panel" may be replaced with an uplink transmission entity (UTE) in general.

Additionally/alternatively, in the description of various embodiments, the expression of "uplink resource (and/or resource group/set)" may be replaced with a PUSCH/PUCCH/SRS/PRACH resource (and/or resource group/set).

Additionally/alternatively, in the description of various embodiments, when it is said that something may be replaced, it may be interpreted to mean that the thing may be modified and applied, and vice versa. That is, in the description of various embodiments, when it is said that something may be modified and applied, it may be interpreted to mean that the thing may be modified and applied in reverse.

Additionally/alternatively, in the description of various embodiments, the term "antenna (and/or antenna port)" may refer to a physical and/or logical antenna (and/or antenna port).

Additionally/alternatively, in the description of various embodiments, the term "panel" may be variously interpreted as follows: a group of antenna elements of a UE, a group of antenna ports of a UE, and/or a group of logical antennas of a UE. For example, which physical/logical antennas and/or antenna ports are bundled and mapped to one panel may be determined in various ways by considering the location/distance/correlation/radio frequency (RF) configuration/antenna (port) virtualization between antennas. For example, such a mapping process may vary according to UE implementation.

Additionally/alternatively, in the description of various embodiments, the term "panel" may mean a plurality of panels and/or a panel group (having a similarity in terms of specific characteristics (e.g., when the difference between values related to the specific characteristic is within a predetermined range and/or below a predetermined threshold)).

Multi-Panel Structure

According to various embodiments, UE modeling where a plurality of panels (configured with one or more antennas) is mounted may be considered when the UE is implemented in high frequency bands. For example, two bi-directional panels may be considered in 3GPP UE antenna modeling.

According to various embodiments, various forms may be considered when implementing a plurality of UE panels. In the description of various embodiments, although it is assumed that the UE supports a plurality of panels, the embodiments may also be applied to a BS (e.g., TRP, etc.) supporting a plurality of panels.

Figure 18:
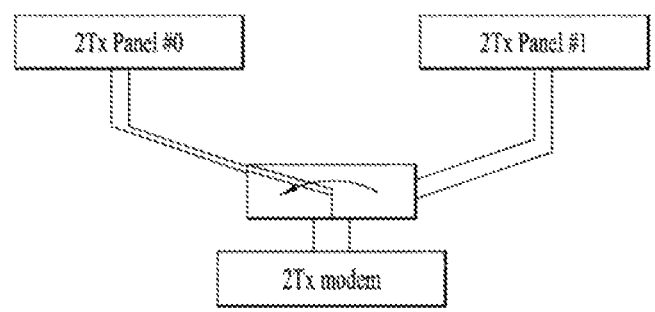
FIG. 18 is a diagram illustrating an example of reporting information on a panel according to various embodiments.

According to various embodiments, the multi-panel structure may be applied when signals and/or channels are transmitted and received based on multiple panels FIG. 18 is a diagram illustrating an exemplary multi-panel structure according to various embodiments.

Referring to FIG. 18, according to various embodiments, the multi-panel structure may be implemented based on RF switching (multi-panel UE implementation based on RF switching).

For example, only one panel may be activated at one instance (a specific instance). To switch the activated panel (e.g., panel switching, etc.), signal transmission may not be allowed for a predetermined period of time.

Figure 19:
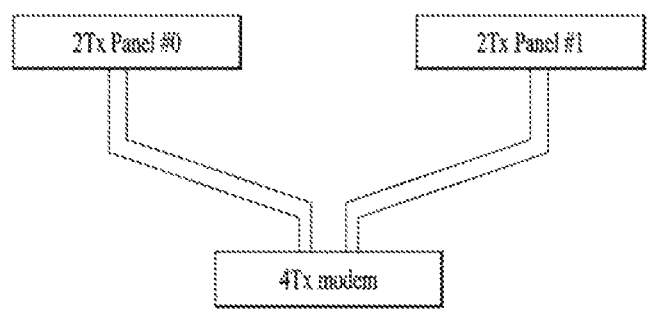
FIG. 19 is a diagram illustrating an exemplary multi-panel structure according to various embodiments.

FIG. 19 is a diagram illustrating an exemplary multi-panel structure according to various embodiments.

Referring to FIG. 19, according to various embodiments, the multi-panel structure may be implemented based on RF connection (multi-panel UE implementation based on RF connection).

For example, RF chains may be connected to each other so that each panel may be activated at any time (any time/always). For example, the time required for panel switching may be zero and/or very small (e.g., a time that may be approximated to 0, a time below a prescribed threshold, etc.). Depending on the configuration of a modem and/or power amplifier, a plurality of panels may be simultaneously activated to transmit signals (for example, simultaneous transmission across multiple panels (STxMP)).

When the UE has a plurality of panels, each panel may have a different radio channel state. Additionally/alternatively, each antenna panel may have a different RF/antenna configuration. Therefore, there is a need for a method of estimating a channel for each panel.

For measurement of UL quality and/or management of UL beams and/or measurement of DL quality for each panel and/or management of DL beams based on channel reciprocity, a process in which one and/or a plurality of SRS resources are transmitted for each panel may be required. For example, the plurality of SRS resources may be SRS resources transmitted on different beams within one panel and/or SRS resources repeatedly transmitted on the same beam.

For convenience of description, a set of SRS resources transmitted on the same panel (e.g., based on specific usage parameters (e.g., beam management, antenna switching, codebook-based PUSCH, non-codebook based PUSCH, etc.) and specific time-domain behaviors (e.g., aperiodically, semi-persistently, and/or periodically) may be referred to as an SRS resource group. That is, the SRS resource group may correspond to a set of SRS resources supported in a wireless communication system to which various embodiments are applicable (e.g., NR system supporting Release 15, etc.). Additionally/alternatively, the SRS resource group may be separately configured by binding one and/or a plurality of SRS resources having the same time domain behavior and usage.

For the same usage and time domain behavior in the NR system supporting Release 15, a plurality of SRS resource sets may be configured only when the usage is beam management. For example, it may be defined that simultaneous transmission is not allowed on SRS resources configured in the same SRS resource set, but simultaneous transmission may be allowed between SRS resources belonging to different SRS resource sets. Accordingly, considering the panel implementation shown in FIG. 16 and/or simultaneous transmission on a plurality of panels, the concept of an SRS resource set may match an SRS resource group, but separate SRS resource groups may be defined in consideration of the implementation shown in FIG. 15 such as panel switching. For example, a specific ID may be given to each SRS resource, resources with the same ID may belong to the same SRS resource group, and resources with different IDs may belong to different resource groups.

For example, it may be assumed that the UE is configured with four SRS resource sets configured for BM (e.g., the RRC parameter usage is set to 'BeamManagement') (for convenience, the four SRS resource sets may be called SRS resource sets A, B, C, and D). Since a total of four (Tx) panels are implemented for the UE, it may be considered that SRS transmission is performed by matching each SRS resource set to one (Tx) panel. For example, a wireless communication system supporting Release-15, may support the UE implementation shown in Table 11.

TABLE 11

Add the following clarification to FG 2-30 that limit the number of SRS resource sets per supported time domain behaviour.

| Maximum number of SRS resource sets across all time domain behaviour (periodic/semi-persistent/aperiodic) reported in 2-30 | Additional constraint on the maximum number of SRS resource sets per supported time domain behaviour (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Table 11, if the UE reports as its capability a value of 7 or 8 for feature groups (FG) 2 to 30, transmission may be performed as follows: a total of up to four SRS resource sets for BM (for each supported time-domain behavior) may be configured as shown in the right column, and one UE panel may correspond to each set for the transmission.

For example, when the four-panel UE performs transmission as follows: each panel corresponds to one SRS resource set for BM, the number of SRS resources configurable for each set may also be supported by separate UE capability signaling.

It may be assumed that two SRS resources are configured in each set. This may correspond to the number of UL beams capable of being transmitted per each panel. For example, when four panels are implemented, the UE may transmit two UL beams on two configured SRS resources for each panel. In this case, in the wireless communication system supporting Release-15, either CB-based UL mode or NCB-based UL mode may be configured. For example, in the wireless communication system that supports Release-15, only a single SRS resource set (with usage set to "CB-based UL" or "NCB-based UL")), i.e., only one dedicated SRS resource set (for a PUSCH) may be supported regardless of cases/configurations.

Multi-Panel UE (MPUE) Category

According to various embodiments, the following three MPUE categories may be considered for the above-described multi-panel operation. According to various embodiments, the three MPUE categories may be divided according to at least one of (i) whether multiple panels are activated and/or (ii) whether transmission based on multiple panels is allowed.

MPUE Category 1

When the UE has multiple panels implemented therein, the UE may activate only one panel at a time. For example, the delay for panel switching/activation may be set to [X] ms (where X is a real number, an integer greater than or equal to 0, an integer, and/or a natural number). The delay may be set longer than the delay for beam switching/activation and configured in units of symbols and/or slots. MPUE category 1 may be replaced with MPUE-assumption 1.

MPUE Category 2

When the UE has multiple panels implemented therein, the UE may activate the multiple panels at a time and use one or more panels for transmission. For example, simultaneous transmission based on panels may be allowed in the corresponding category. MPUE category 2 may be replaced with MPUE-assumption2.

MPUE Category 3

When the UE has multiple panels implemented therein, the UE may activate the multiple panels at a time but use only one panel for transmission. MPUE category 3 may be replaced with MPUE-assumption3.

According to various embodiments, one or more of the above-described three MPUE categories may be supported for transmission/reception of signals and/or channels based on multiple panels.

For example, MPUE category 3 among the three MPUE categories may be (optionally) supported in the wireless communication system supporting Release-16.

For example, information on the MPUE category may be predefined by standards (specifications). Accordingly, the information on the MPUE category may be known in advance by the UE and/or the network without separate configuration/indication.

Additionally/alternatively, the information on the MPUE category may be indicated/configured semi-statically or dynamically depending on the state of the system (e.g., from the perspective of the network and/or UE). The configuration/indication related to transmission/reception of signals and/or channels based on multiple panels may be configured/indicated in consideration of the MPUE category.

Configuration/Indication Related to Panel-Specific Transmission/Reception

According to various embodiments, transmission/reception of signals and/or channels may be performed panel-specifically. Panel-specific transmission/reception may mean that transmission/reception of signals and/or channels are performed in units of panels. For example, panel-specific transmission/reception may be referred to as panel-selective transmission/reception.

According to various embodiments, identification information (e.g., identifier (ID), indicator, etc.) may be used for panel-specific transmission/reception in operation based on multiple panels. Hereinafter, a panel ID will be described as an example of identification information for configuring and/or indicating a panel, but this may be replaced with identification information, an indicator, etc.

For example, the ID of a panel among a plurality of activated panels may be used for panel-selective transmission of a PUSCH, a PUCCH, an SRS, and/or a PRACH.

According to various embodiments, the panel ID may be configured/defined based on at least one of the following four alternatives (Alts. 1, 2, 3, and 4).

Alt. 1

According to various embodiments, the panel ID may be an SRS resource set ID.

For example, considering the following cases: a) when SRS resources in several SRS resource sets having the same time-domain operation are simultaneously transmitted in the same BWP, b) when a power control parameter is configured in units of SRS resource sets, c) when the UE supports a maximum of four SRS resource sets (corresponding to up to four panels) depending on the supported time-domain operation, each UE Tx panel may correspond to an SRS resource set configured in terms of the UE implementation.

For Alt. 1, the SRS resource set associated with each panel may be used for PUSCH transmission based on 'codebook' and 'non-codebook'.

For Alt. 1, several SRS resources belonging to several SRS resource sets may be selected by extending the SRI field of DCI.

For example, an SRI-to-SRS resource mapping table may need to be extended to include SRS resources in all the SRS resource sets.

Alt. 2

According to various embodiments, the panel ID may be an ID (directly) associated with a reference RS resource and/or reference RS resource set.

Alt. 3

According to various embodiments, the panel ID may be an ID (directly) associated with a target RS resource and/or target RS resource set.

For Alt. 3, a configured SRS resource set corresponding to one UE Tx panel may be easily controlled, and the same panel ID may be assigned to multiple SRS resource sets with different time-domain operations.

Alt. 4

According to various embodiments, the panel ID may be an ID additionally configured for spatial relation information (e.g., RRC_SpatialRelationInfo).

Alt. 4 may correspond to a method of newly adding information for indicating the panel ID. For example, in this case, a configured SRS resource set corresponding to one UE Tx panel may be easily controlled, and the same panel ID may be assigned to multiple SRS resource sets with different time-domain operations.

For example, a UL TCI may be introduced in relation to a DL TCI. UL TCI state definitions may include a list of reference RS resources (e.g., SRS, CSI-RS, and/or SSB). For example, the SRI field may be reused to select a UL TCI state from the configured set, and/or a new DCI field (e.g., UL-TCI field) in DCI (e.g., DCI format 0_1) may be defined for the same purpose.

According to various embodiments, the above-described panel-specific transmission/reception related information (e.g., panel ID, etc.) may be provided by higher layer signaling (e.g., RRC message, MAC-CE, etc.) and/or lower layer signaling (e.g., L1 signaling, DCI, etc.). According to various embodiments, the corresponding information may be transmitted from the BS (and/or network node) to the UE and/or from the UE to the BS (and/or network node) according to circumstances or needs.

Additionally/alternatively, according to various embodiments, the corresponding information may be configured in a hierarchical manner as follows: a set of candidates are first configured and then specific information is indicated.

Additionally/alternatively, according to various embodiments, the above-described panel related identification information may be configured in units of a single panel and/or in units of multiple panels (e.g., panel group, panel set, etc.).

Figure 20:
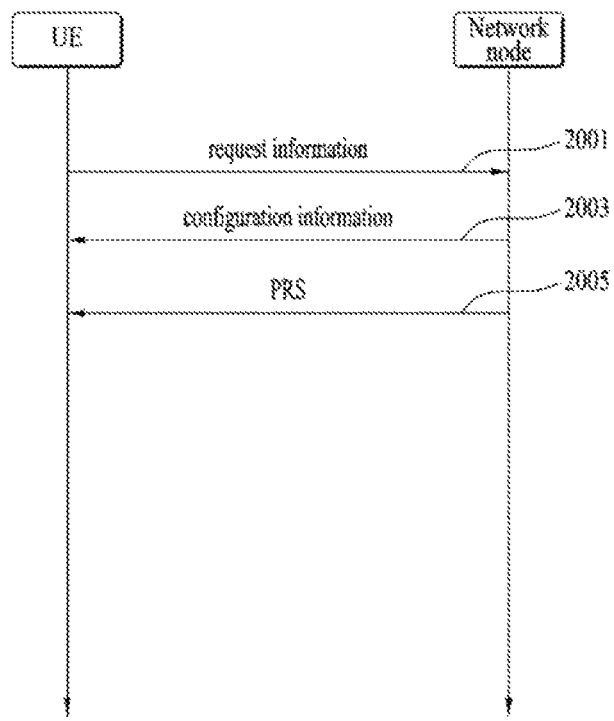
FIG. 20 is a diagram schematically illustrating a method of operating a UE and a network node according to various embodiments.

FIG. 20 is a diagram schematically illustrating a method of operating a UE and network nodes according to various embodiments.

Figure 21:
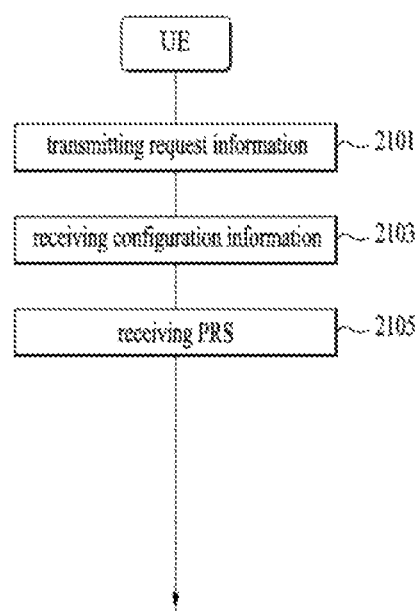
FIG. 21 is a flowchart illustrating a method of operating the UE according to various embodiments.

FIG. 21 is a flowchart illustrating a method of operating the UE according to various embodiments.

Figure 22:
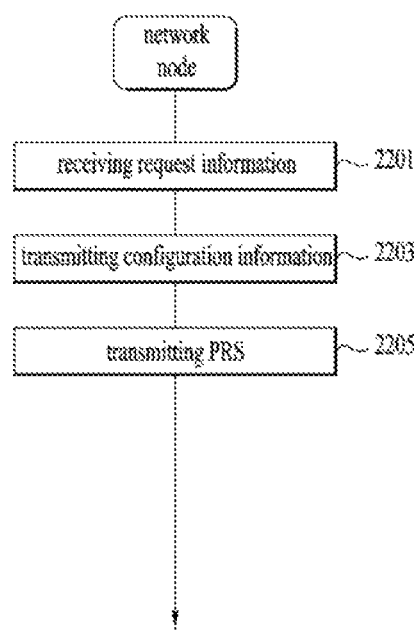
FIG. 22 is a flowchart illustrating a method of operating the network node according to various embodiments.

FIG. 22 is a flowchart illustrating a method of operating the network node according to various embodiments. For example, the network node may be a TP, and/or a BS, and/or a cell, and/or a location server, and/or LMF, and/or any device configured to perform the same task.

Referring to FIGS. 20 to 22, in operations 2001, 2101, and 2201, a UE may transmit request information related to requesting one or more DL PRSs, and the network node may receive the same.

In operations 2003, 2103, and 2203, the network node may transmit configuration information related to the one or more DL PRSs in response to the request information, and the UE may receive the same.

In operations 2005, 2105, and 2205, the network node may transmit the one or more DL PRSs, and the UE may receive the.

According to various embodiments, the request information may include one or more requests related to the configuration information.

According to various embodiments, the one or more requests may include one or more of: (i) a request related to the number of transmission and reception points (TRPs): (ii) a request related to the number of DL PRS resources included in a DL PRS resource set: (iii) a request related to a bandwidth of the DL PRS resources: or (iv) a request related to a repetition number of the DL PRS resources.

Although the DL PRS has been described as an example, various embodiments may also be applied to the UL PRS (e.g., positioning SRS), as described above.

Specific operations of the UE and/or the network node according to the above-described various embodiments may be described and performed based on Section 1 to Section 3 described before.

Since examples of the above-described proposal method may also be included in one of implementation methods of the various embodiments, it is apparent that the examples can be construed as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 23 is a diagram illustrating a device that implements various embodiments.

Figure 23:
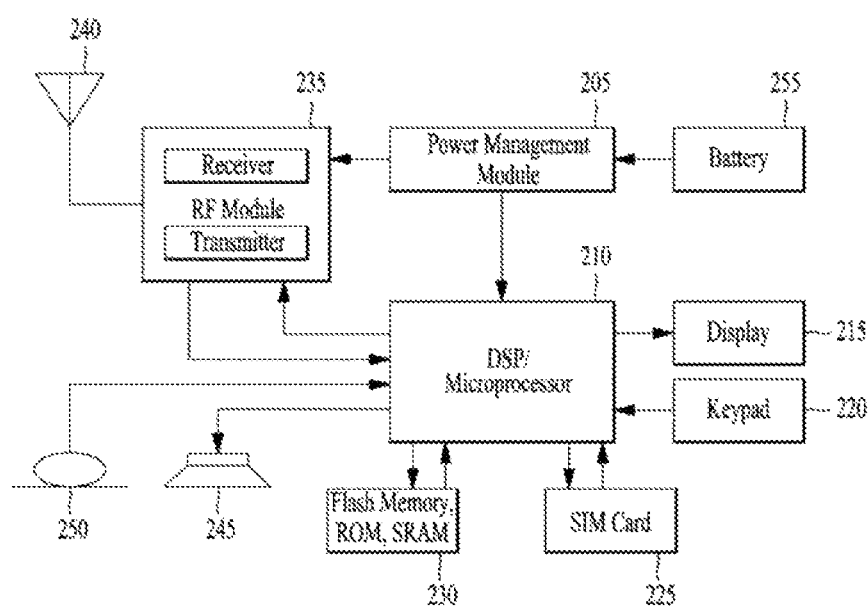
FIG. 23 is a block diagram illustrating an apparatus for implementing various embodiments of the present disclosure.

The device illustrated in FIG. 23 may be a UE and/or a BS (e.g., eNB or gNB or TP) and/or a location server (or LMF) which is adapted to perform the above-described mechanism, or any device performing the same operation.

Referring to FIG. 23, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 23 may illustrate a UE including a receiver 235 configured to receive a request message from a network and a transmitter 235 configured to transmit timing transmission/reception timing information to the network.

These receiver and transmitter may form the transceiver 235. The UE may further include a processor 210 coupled to the transceiver 235.

Further, FIG. 23 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, one or more processors included in the UE (or one or more processors of a communication device included in the UE) may transmit request information related to requesting one or more downlink (DL) positioning reference signals (PRSs).

According to various embodiments, the one or more processors included in the UE may receive configuration information related to the one or more DL PRSs in response to the request information.

According to various embodiments, the one or more processors included in the UE may receive the one or more DL PRSs based on the configuration information.

According to various embodiments, the request information may include one or more requests related to the configuration information.

According to various embodiments, the one or more requests may include one or more of: (i) a request related to the number of transmission and reception points (TRPs): (ii) a request related to the number of DL PRS resources included in a DL PRS resource set: (iii) a request related to a bandwidth of the DL PRS resources; or (iv) a request related to a repetition number of the DL PRS resources.

According to various embodiments, the request information may be transmitted based on one or more of a physical random access channel (PRACH) preamble or a PRACH sequence.

According to various embodiments, the PRACH preamble or PRACH sequence may be included in each of a plurality of predefined PRACH preambles or a plurality of predefined PRACH sequences.

According to various embodiments, the plurality of predefined PRACH preambles or the plurality of PRACH sequences may be divided into a plurality of groups.

According to various embodiments, one or more PRACH preambles or one or more PRACH sequences included in a first group among the plurality of groups may be mapped to requesting the one or more DL PRSs.

According to various embodiments, one or more PRACH preambles or one or more PRACH sequences included in a second group among the plurality of groups may be mapped to requesting one or more uplink reference signals (UL RSs).

According to various embodiments, one or more PRACH preambles or one or more PRACH sequences included in a third group among the plurality of groups may be mapped to requesting both the one or more DL PRSs and the one or more UL RSs According to various embodiments, the one or more processors included in the UE may transmit information related to one or more measurements for positioning based on the one or more DL PRSs.

According to various embodiments, the request information may further include information for requesting a resource for transmission of information related to the measurements.

According to various embodiments, the one or more requests may further include v) a request related to one or more beam directions for transmission of the one or more DL PRSs According to various embodiments, the request information may further include information for requesting cancellation of one or more of the one or more PRS resources or one or more PRS resource sets for the one or more PRSs after a preset time.

According to various embodiments, in response to the information for requesting the cancellation, information indicating canceling the one or more of the one or more PRS resources or one or more PRS resource sets for the one or more PRSs after the preset time may be received based on downlink control information (DCI) or a medium access control (MAC) control element (CE) signal.

According to various embodiments, one or more processors included in the network node (or one or more processors of a communication device included in the network node) may receive request information related to requesting one or more downlink (DL) positioning reference signals (PRSs).

According to various embodiments, the one or more processors included in the network node may transmit configuration information related to the one or more DL PRSs in response to the request information.

According to various embodiments, the one or more processors included in the network node may transmit the one or more DL PRSs related to the configuration information.

According to various embodiments, the request information may include one or more requests related to the configuration information.

According to various embodiments, the one or more requests may include one or more of: (i) a request related to the number of transmission and reception points (TRPs): (ii) a request related to the number of DL PRS resources included in a DL PRS resource set: (iii) a request related to a bandwidth of the DL PRS resources: or (iv) a request related to a repetition number of the DL PRS resources.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied Various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
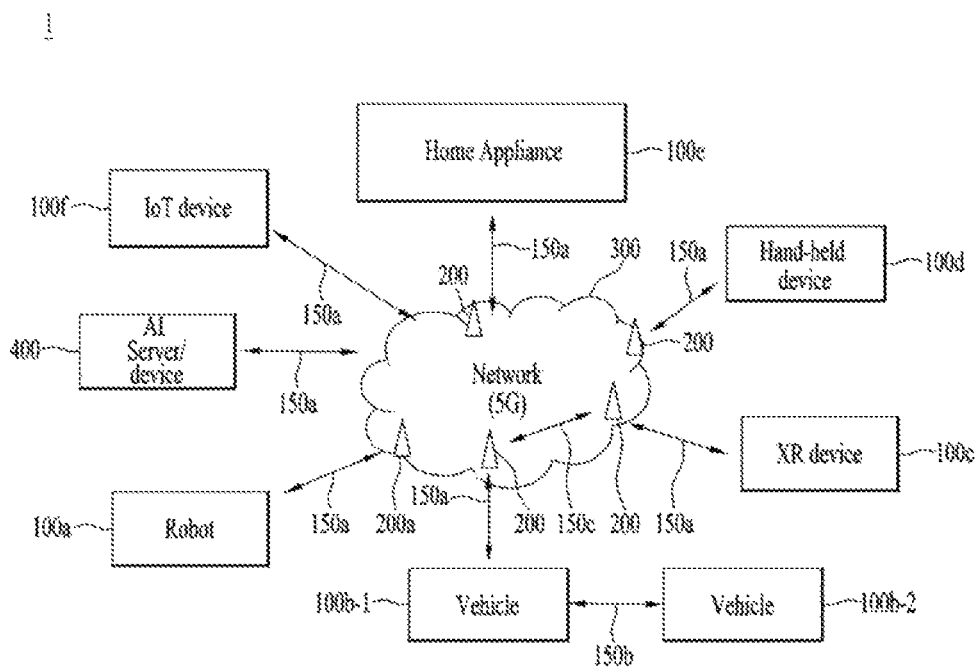
FIG. 24 illustrates an exemplary communication system to which various embodiments of the present disclosure are applied

FIG. 24 illustrates an exemplary communication system to which various embodiments of the present disclosure are applied.

Referring to FIG. 24, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 25:
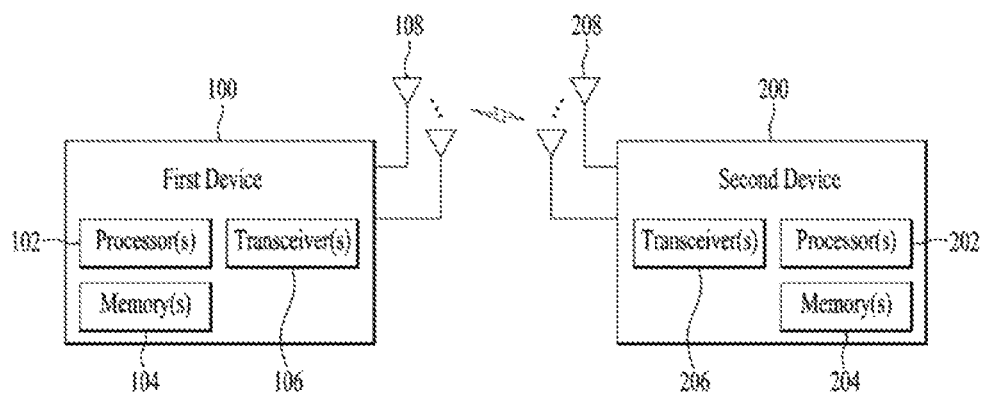
FIG. 25 illustrates exemplary wireless devices to which various embodiments of the present disclosure are applicable.

Example of Wireless Devices to which Various Embodiments of the Present Disclosure are Applied FIG. 25 illustrates exemplary wireless devices to which various embodiments of the present disclosure are applicable.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 26:
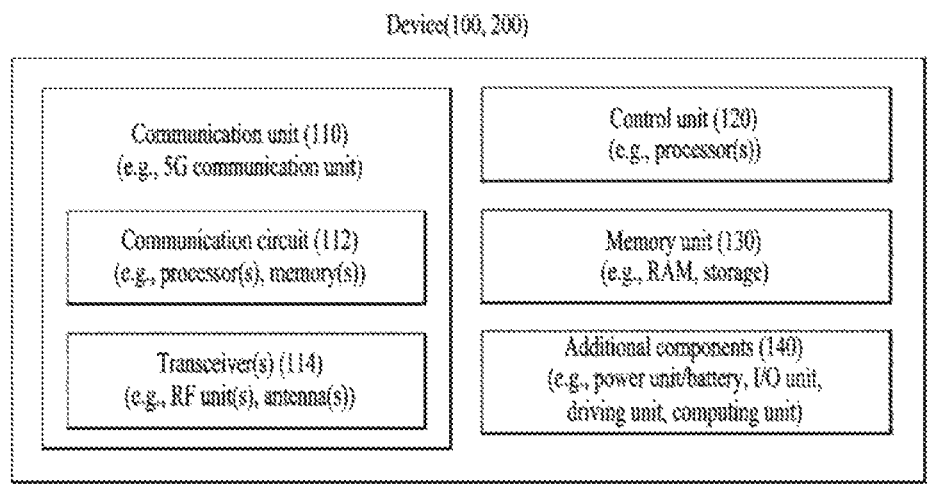
FIG. 26 illustrates other exemplary wireless devices to which various embodiments of the present disclosure are applied.

Example of Using Wireless Devices to which Various Embodiments of the Present Disclosure are Applied FIG. 26 illustrates other exemplary wireless devices to which various embodiments of the present disclosure are applied. The wireless devices may be implemented in various forms according to a use case/service (see FIG. 24).

Referring to FIG. 26, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a Fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
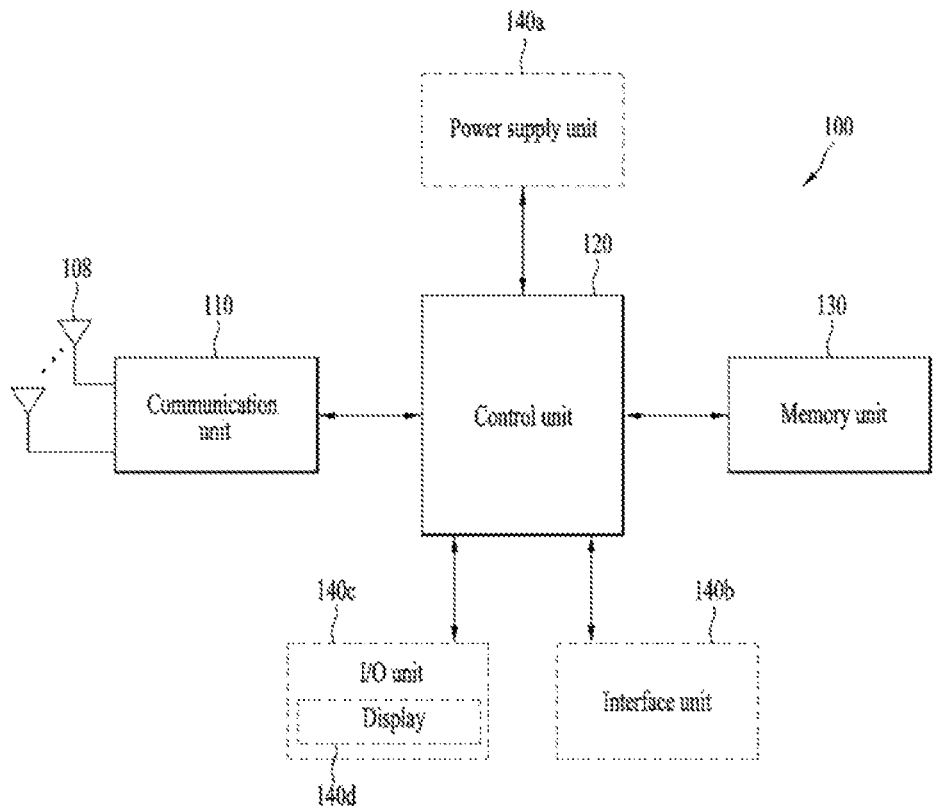
FIG. 27 illustrates an exemplary portable device to which various embodiments of the present disclosure are applied.

Example of Portable Device to which Various Embodiments of the Present Disclosure are Applied FIG. 27 illustrates an exemplary portable device to which various embodiments of the present disclosure are applied. The portable device may be any of a smartphone, a smart-pad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments of the Present Disclosure.

Figure 28:
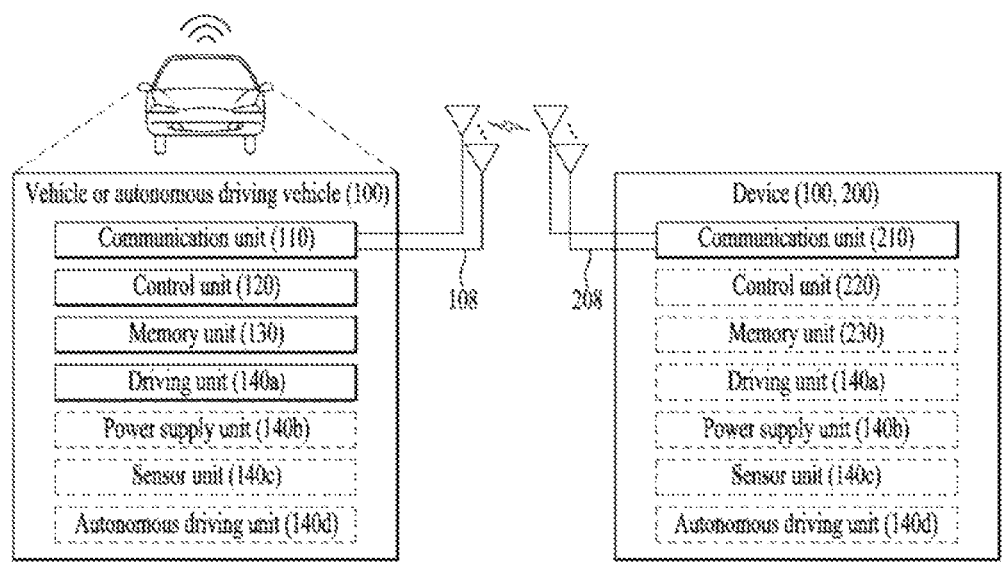
FIG. 28 illustrates an exemplary vehicle or autonomous driving vehicle to which various embodiments of the present disclosure are applied.

FIG. 28 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0), 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a terminal, the method comprising:
transmitting a first signal related to request information including information regarding a number of downlink (DL) positioning reference signal (PRS) resources, information regarding a DL PRS resource bandwidth, and information regarding a DL PRS resource repetition;
receiving a second signal related to DL PRS configuration information; and
receiving one or more DL PRSs based on the second signal related to the DL PRS configuration information,
wherein the terminal is configured with (i) a first physical random access channel (PRACH) preamble related to an on-demand DL PRS request, (ii) a second PRACH preamble related to an on-demand sounding reference signal (SRS) request, (iii) a third PRACH preamble related to both the on-demand DL PRS request and the on-demand SRS request, and
wherein the first signal is transmitted based on the first PRACH preamble or the third PRACH preamble.

2. The method of claim 1, further comprising:
transmitting information related to one or more measurements for positioning based on the one or more DL PRSs,
wherein the request information further includes information for requesting a resource for transmission of information related to the one or more measurements.

3. The method of claim 1, wherein the request information comprises:
a request related to one or more transmission beam directions of the one or more DL PRSs.

4. The method of claim 1, wherein the request information further includes information for requesting cancellation of one or more DL PRS resources after a preset time,
the method further comprising:
in response to the information for requesting the cancellation, receiving information indicating canceling the one or more of the one or more DL PRS resources after the preset time based on downlink control information (DCI) or a medium access control (MAC) control element (CE) signal.

5. A terminal comprising:
a transceiver; and
one or more processors coupled to the transceiver,
wherein the one or more processors are configured to:
transmit a first signal related to request information including information regarding a number of downlink (DL) positioning reference signal (PRS) resources, information regarding a DL PRS resource bandwidth, and information regarding a DL PRS resource repetition;
receive a second signal related to DL PRS configuration information; and
receive one or more DL PRSs based on the second signal related to the DL PRS configuration information,
wherein the terminal is configured with (i) a first physical random access channel (PRACH) preamble related to an on-demand DL PRS request, (ii) a second PRACH preamble related to an on-demand sounding reference signal (SRS) request, (iii) a third PRACH preamble related to both the on-demand DL PRS request and the on-demand SRS request, and wherein the first signal is transmitted based on the first PRACH preamble or the third PRACH preamble.

6. The terminal of claim 5, wherein the one or more processors are configured to:
transmit information related to one or more measurements for positioning based on the one or more DL PRSs,
wherein the request information further includes information for requesting a resource for transmission of information related to the one or more measurements.

7. The terminal of claim 5, wherein the one or more processors are configured to:
communicate with one or more of a mobile terminal, a network, and an autonomous vehicle other than a vehicle containing the terminal.

8. A method performed by a base station, the method comprising:
receiving a first signal related to request information including information regarding a number of downlink (DL) positioning reference signal (PRS) resources, information regarding a DL PRS resource bandwidth, and information regarding a DL PRS resource repetition;
transmitting a second signal related to DL PRS configuration information; and
transmitting one or more DL PRSs based on the second signal related to the DL PRS configuration information,
wherein the base station configures the terminal with (i) a first physical random access channel (PRACH) preamble related to an on-demand DL PRS request, (ii) a second PRACH preamble related to an on-demand sounding reference signal (SRS) request, (iii) a third PRACH preamble related to both the on-demand DL PRS request and the on-demand SRS request, and
wherein the first signal is received based on the first PRACH preamble or the third PRACH preamble.

* * * * *